United States Patent
Goergen et al.

(10) Patent No.: US 7,945,884 B1
(45) Date of Patent: May 17, 2011

(54) BACKPLANE ROUTING ARRANGEMENT WITH DECREASED CROSSTALK

(75) Inventors: Joel R. Goergen, Maple Grove, MN (US); John D'Ambrosia, Harrisburg, PA (US)

(73) Assignee: Force 10 Networks, Inc., San Jose, CA (US)

( * ) Notice: Subject to any disclaimer, the term of this patent is extended or adjusted under 35 U.S.C. 154(b) by 428 days.

(21) Appl. No.: 12/080,964

(22) Filed: Apr. 8, 2008

(51) Int. Cl.
*G06F 17/50* (2006.01)

(52) U.S. Cl. .................. 716/126; 716/115; 370/351

(58) Field of Classification Search .............. 716/115, 716/126; 370/351
See application file for complete search history.

(56) References Cited

U.S. PATENT DOCUMENTS

| 6,812,803 | B2* | 11/2004 | Goergen ........................... 333/1 |
| 7,088,711 | B2* | 8/2006 | Goergen et al. ............... 370/360 |
| 7,213,026 | B2* | 5/2007 | Evans et al. ...................... 1/1 |
| 7,242,215 | B2* | 7/2007 | Snider et al. .................... 326/38 |
| 7,676,733 | B2* | 3/2010 | Ganga et al. ................. 714/775 |
| 2003/0147375 | A1* | 8/2003 | Goergen et al. ............... 370/351 |
| 2007/0130246 | A1* | 6/2007 | Lau et al. ....................... 709/200 |
| 2009/0292855 | A1* | 11/2009 | Scott et al. .................... 710/316 |

* cited by examiner

*Primary Examiner* — Naum Levin
(74) *Attorney, Agent, or Firm* — Robert Schuler

(57) ABSTRACT

Methods of designing a backplane, a backplane, and a packet switch using such a backplane are disclosed. The backplane comprises communication channels that connect each of a set of first card slots to each of a set of second card slots. Instead of forcing the backplane to route the communication channels to match a preset card configuration, the backplane communication channels are routed so as to reduce crosstalk and attenuation on at least the most difficult routing pairs. The cards perform logical translation of their backplane traffic to conform to the physical pin assignment for the particular card slot in which they are inserted. Other embodiments are also described and claimed.

8 Claims, 19 Drawing Sheets

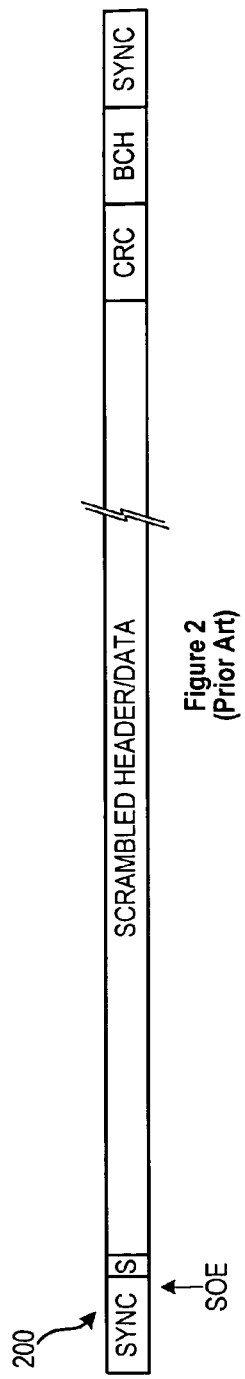

BACKPLANE ROUTING ARRANGEMENT WITH DECREASED CROSSTALK

BACKGROUND

1. Field of the Invention

The present disclosure relates generally to packet switch/router design and operation, and more particularly to techniques for reducing serial channel crosstalk across an electrical backplane.

2. Description of Related Art

Packets switches/routers have external ports on which they receive and transmit packets. Most received packet traffic has a destination other than the switch/router itself. The packet/switch router determines, from a packet's headers, and possibly the port on which the packet is received, an appropriate output port or ports for each such packet. The packet is switched internally to the desired output port or ports that move the packet towards its destination.

Most switch/routers have an internal switching architecture capable of sustaining an internal packet throughput at least roughly equal to the aggregate line rate of all the external ports on the switch/router (some architectures allow an "oversubscribed" configuration that assumes all external ports are operating on average at some fraction of their line rate). 10 Gbps (Billion bits/second) ports are now becoming common, and systems are in design for even higher line rate external ports. Accordingly, the internal switching architectures for medium-to-large switch/routers handling 10 Gbps and higher-speed external ports require internal throughputs measurable in Terabits/second (Tbps) to tens of Tbps. Practically, such systems are modular, with the external ports hosted on multiple line cards that attach to one or more backplanes. Internal packet switching between line cards requires passing the packet data across a backplane.

FIG. 1 shows one prior art data plane architecture for a high-speed switch/router 100. The data plane architecture includes line cards LC0 to LCn, switch fabric cards SF0 to SFm, and a backplane 110 to which the line cards and switch fabric cards connect. Line cards can support different external signaling speeds and formats as needed for a particular application. All line card options are compatible, however, with the backplane and switch fabric cards.

Line card LC0 is representative of all line cards. Line card LC0 contains physical interface devices PHY0.0, PHY0.1, PHY0.2, packet processor devices IPP0 and EPP0, traffic manager devices ITM0 and ETM0, and serializer/deserializer (SERDES) devices (grouped together as SDL0), as well as other control plane devices (not shown) for managing the illustrated devices. Each physical interface device supports one or more external ports of a desired format and speed, to which external connections (e.g., copper cable or fiber optic cable) are made. The physical interface devices interpret the physical signaling for received packet data, and supply received packet data to an ingress packet processor device IPP0. Ingress packet processor IPP0 provides any necessary updates to each packet, determines an appropriate egress port or ports for each packet, tags the packets with an internal header, and submits them to an ingress traffic manager ITM0 for queuing. Ingress traffic manager ITM0 queues each packet with others of similar priority that are destined for the same egress line card, and notifies a central scheduler (not shown) as to which queues have data waiting. When instructed by the scheduler, packets bound for a particular egress line card are dequeued and presented to SERDES SDL0 for transmission across the backplane.

On the egress side, line card LC0 SERDES SDL0 receives packet data for packets that an ingress processor has determined have an egress port served by line card LC0. SERDES SDL0 deserializes the packet data and supplies the data to an egress traffic manager ETM0 for queuing. ETM0 supplies the packets to an egress packet processor EPP0 in a manner that attempts to treat packets of similar priority fairly. Egress packet processor EPP0 performs any necessary packet header manipulation, removes the internal tag headers, and supplies the packets to the appropriate physical interface device for transmission on an external port.

Backplane 110 connects the line cards and switch fabric cards to the system. Backplane 110 contains male connectors, e.g., CML0, aligned to connect with companion line card female connectors, e.g., connector CFL0 on line card LC0. Backplane 110 also contains male connectors, e.g., CMS0, aligned to connect with companion switch fabric card female connectors, e.g., connector CFS0 on switch fabric card SF0.

To support data plane traffic, backplane 110 contains differential trace pairs connecting designated pins of each line card male connector to each switch fabric male connector. For instance, at each line card slot, one defined connector pin pair supports transmission across a differential trace pair to switch fabric card SF0, and another defined connector pin pair supports reception across a differential trace pair from switch fabric card SF0. Other defined connector pin pairs at each line card slot support transmission and reception to other switch fabric cards, and/or additional channels to switch fabric card SF0. Likewise, at each switch fabric card slot, one defined connector pin pair supports transmission across a differential trace pair to line card LC0, and another defined connector pin pair supports reception across a differential trace pair from line card LC0. Other defined connector pin pairs at each switch fabric card slot support transmission and reception to/from other line cards, and/or additional channels to line card LC0.

Switch fabric card SF0 is representative of all switch fabric cards. Switch fabric card SF0 contains a crossbar switch CS0 and SERDES devices (grouped together as SDS0), as well as other control plane devices (not shown) for managing the illustrated devices. The SERDES devices SDS0 function like the line card SERDES devices, such that each device communicates across a backplane differential trace pair with a paired device. Each SERDES submits parallel data to the crossbar switch CS0, and receives parallel data from the crossbar switch (this is generally true, although some channels could be idle, depending on the crossbar configuration). A central scheduler (not shown) supplies the crossbar switch CS0 with a configuration schedule that describes the crossbar configurations desired to effectuate the transfer of packets from their respective ingress line cards to their respective egress line cards.

The configuration schedule changes the crossbar configuration once per epoch, where each epoch allows each scheduled line card the opportunity to transmit (as typically configured) tens of thousands of octets of packet data to a target line card. When a line card is scheduled, it selects packets from one or more queues corresponding to the scheduled destination, divides the packet data for parallel transmission to all of the switch fabric cards, and sends the packet data to the switch fabric cards at the appropriate epoch. The crossbar switches turn the packet data simultaneously to the appropriate egress channels to reach the scheduled egress line card—which receives and reassembles the packet data. Many such transfers can occur simultaneously during the same epoch, with the scheduler scheduling as many non-conflicting transfers as possible each epoch.

In one embodiment, a hybrid signaling scheme is used to send data across the backplane. Each transmitting SERDES constructs a backplane epoch frame 200, illustrated in FIG. 2. The packet headers and data supplied by the ITM to the SERDES are scrambled prior to transmission. The remainder of epoch frame 200 is transmitted using 8b/10b block coding, as follows. Each frame begins and ends with a string of 8b/10b alignment characters (see portions of epoch frame 200 labeled "SYNC"), which each SERDES transmits when it has no other data to send. When the SERDES receives a start of epoch ("SOE") signal, it transmits some minimum number of sync characters, followed by an 8b/10b start character S. The start character is followed by scrambled packet headers/data, a cyclic redundancy check trailer CRC in 8b/10b format, and a back channel trailer BCH in 8b/10b format. After the back channel trailer BCH, the SERDES resumes transmitting alignment characters until the next SOE is received.

FIG. 3 shows a block diagram 300 for a SERDES transmit/receive pair as used in switch/router 100. Parallel data DATA IN is scrambled by a scrambler upon the command of a control block. The control block also produces the 8b/10b control and header/trailer characters, and operates a multiplexer that merges the 8b/10b characters with the scrambler output SCR for submission to a differential transmitter Tx. The control block resets the scrambler with a seed value at the beginning of each epoch. On the deserializer path, a differential receiver Rx senses data and recovers timing for a received differential signal. A SYNC block detects the 8b/10b alignment characters in the data stream and aligns the data appropriately on 8b/10b word boundaries. An inbound control block receives the 8b/10 control and header/trailer characters through a demultiplexer, and directs the scrambled data to a descrambler. The descrambler is reset from a seed register each epoch, allowing it to create descrambled DATA OUT. The inbound control block may receive back channel data BCH that comprises transmit tap coefficient instructions for Tx, which the inbound control block passes to the outbound control block. The inbound control block may also receive back channel data BCH that allows it to adjust the decision feedback equalization (DFE) taps in Rx.

BRIEF DESCRIPTION OF THE DRAWINGS

The present invention can be best understood by reading the specification with reference to the following Figures, in which:

FIG. 2 shows a hybrid scrambled epoch frame format useful with the modular switch/router of FIG. 1;

FIG. 3 contains a block diagram for a SERDES receive/transmit pair useful with the modular switch/router of FIG. 1 and the epoch frame format of FIG. 2;

DETAILED DESCRIPTION

Figure 1:
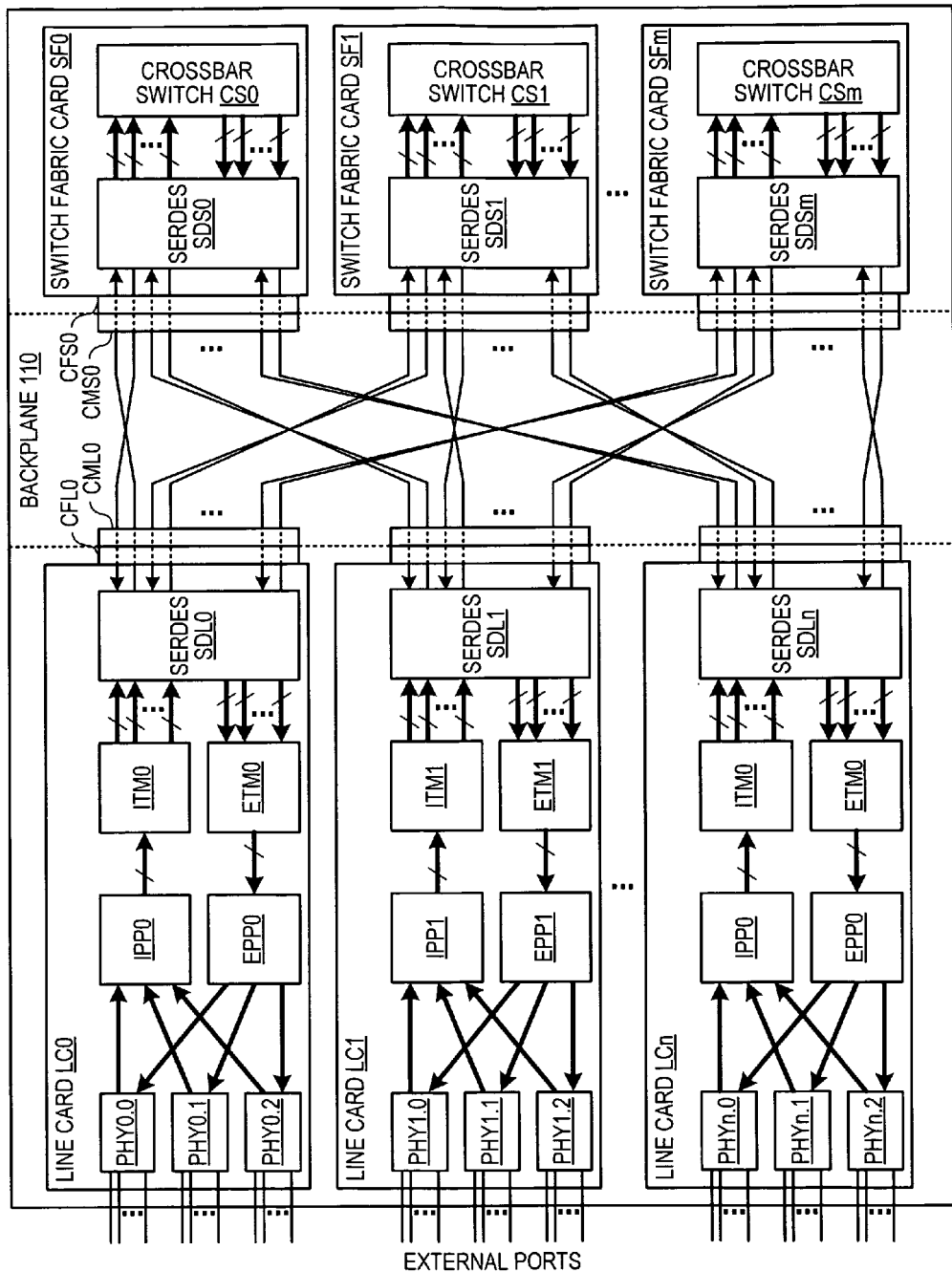
FIG. 1 shows, in block diagram form, various data plane components of a prior art modular switch/router.

As backplane signaling speeds increase to support faster external ports, the reliable transport of data across an electrical backplane becomes more difficult. Higher signaling speeds generally require higher symbol rates and/or additional symbol levels. Higher symbol rates create additional signal loss within the backplane, partially manifest as crosstalk signals appearing on neighboring conductors. Additional signal levels either create more crosstalk (assuming a fixed minimum signal level spacing and therefore more power) or require better signal-to-noise ratio (SNR) at the receiver. In all such cases, the proper design and operation of a backplane become more significant to the reliable operation of the packet switch at its designed throughput.

It has now been discovered that prior efforts in the field of modular packet switch design and operation were constrained in ways that negatively impacted backplane performance, and can now be removed. For instance, in the past, modularity has required that all backplane slots accepting a given card type conform to a defined logical pinout expected by the card type. As another example, physical backplane channels were similarly constrained, e.g., the ith physical channel connection at each line card slot connected to the same switch fabric slot. Further, each backplane channel was constrained to use a common signaling format, signaling speed, scrambler polynomial and scrambler seed (if employed), etc. Due to constraints such as these, there was little static (design time) flexibility and no dynamic (run time) flexibility available to the engineer hoping to manage crosstalk on the backplane.

Methods, circuits, and architectures described below are at least partially influenced by the desire to passively and actively manage backplane crosstalk in ways that were previously unavailable. In general, in the following embodiments line card traffic managers and backplane schedulers operate on a set of logical backplane channels. A line card ingress traffic manager submits packets to a given ingress logical channel set, and a line card egress traffic manager receives packets from a given egress logical channel set, both corresponding to the line card slot. Depending on the position of the line card in the chassis, however, the physical arrangement and signaling parameters for the physical channels corresponding to the logical channel set may differ both statically and dynamically. The management of the physical channels is ideally transparent to the traffic managers and schedulers (although either can, in some embodiments, participate in the implementation of dynamic logical-to-physical channel solutions). In at least some embodiments, the backplane physical channel routing constraints previously imposed by modularity are relaxed to allow better physical channel routing solutions during backplane design. Further, in at least some embodiments channel performance can be improved dynamically by a variety of techniques that influence the crosstalk relationship between a victim backplane physical channel and its neighboring aggressor backplane physical channels.

Figure 4:
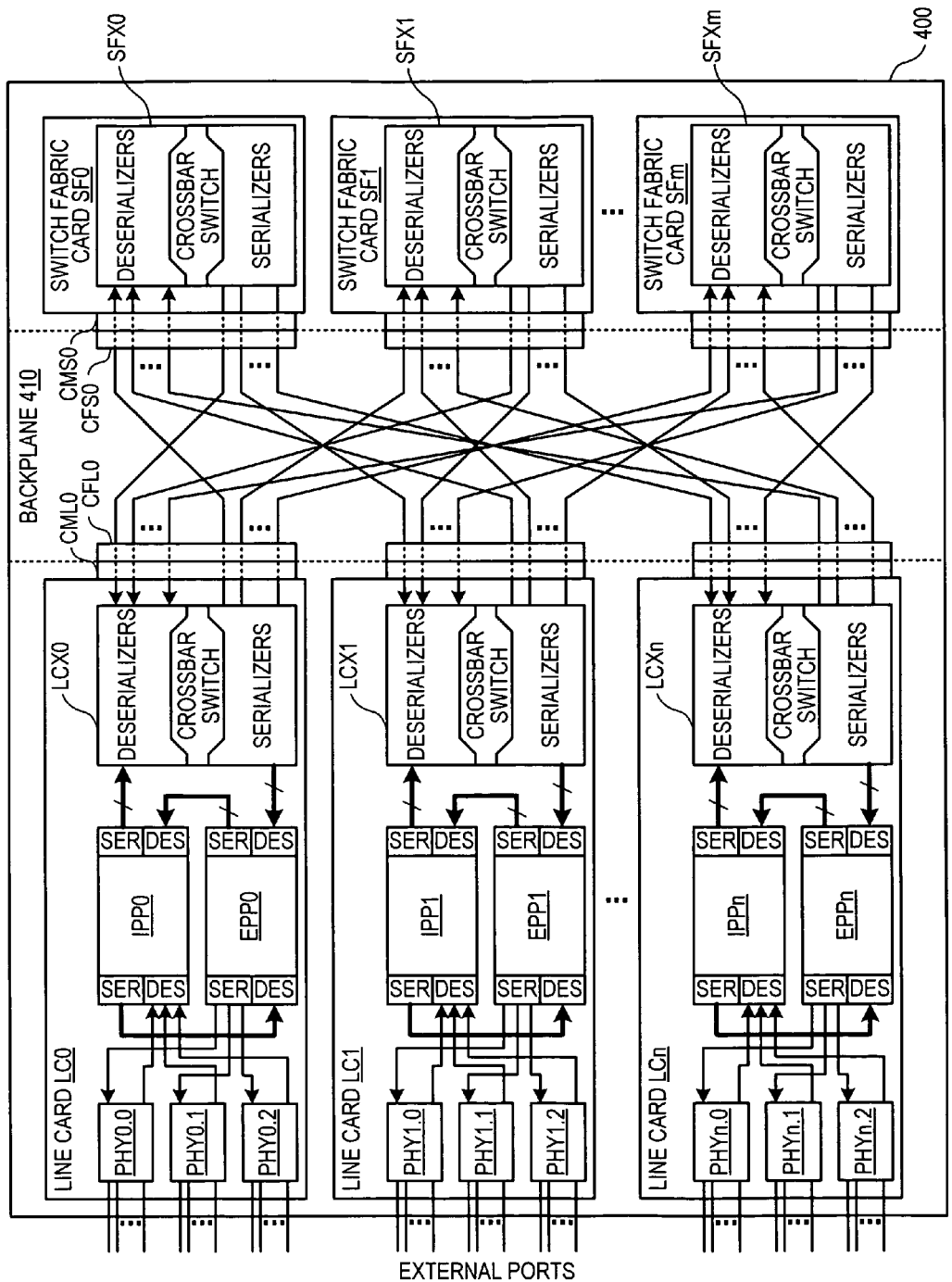
FIG. 4 depicts, in block diagram form, various data plane components of a modular switch/router according to an embodiment.

Flexibility in the layout and operation of the packet switch exists due to the incorporation of crossbar switches in both the line cards and switch fabric cards. FIG. 4 shows a data plane layout for one packet switch embodiment 400. Like in the FIG. 1 example, line cards LC0 to LCn communicate with a switch fabric card SF0 to SFm. Unlike the FIG. 1 example, however, each backplane connection connects a crossbar switch on a line card to a crossbar switch on a switch fabric card. Taking line card LC0 as exemplary, an ingress packet processor IPP0 serves ingress packets and an egress packet processor EPP0 serves egress packets. The ingress packet processor IPP0 has a group of serializers that connect to corresponding deserializers on crossbar switch LCX0. The egress packet processor EPP0 has a group of deserializers that connect to corresponding serializers on crossbar switch LCX0. In one embodiment, IPP0 and EPP0 are the same type of device, programmed appropriately for ingress and egress packet flow, respectively. Since each has a group of serializers and a group of deserializers, the unused serializers on EPP0 are coupled to the unused deserializers on IPP0, allowing backchannel information to be communicated from the EPP deserializers to the IPP serializers. These serializer/deserializer connections are also useful in a loopback test mode.

Crossbar switch LCX0 distributes packet data from IPP0 to the switch fabric cards according to a crossbar configuration, and also distributes packet data from the switch fabric cards to EPP0 according to the crossbar configuration. In one embodiment, the crossbar configuration for LCX0 is set at boot time. In another embodiment, the crossbar configuration is changed on an epoch basis, depending on the target for ingress packets and/or the source for egress packets.

Each line card crossbar switch distributes and collects serial channel data from all of the switch fabric crossbar switches, and vice versa. In this embodiment, a common ASIC is used both for the line card crossbar switches and the switch fabric crossbar switches. The design of this ASIC will now be described for an exemplary crossbar switch SFXi.

Figure 5:
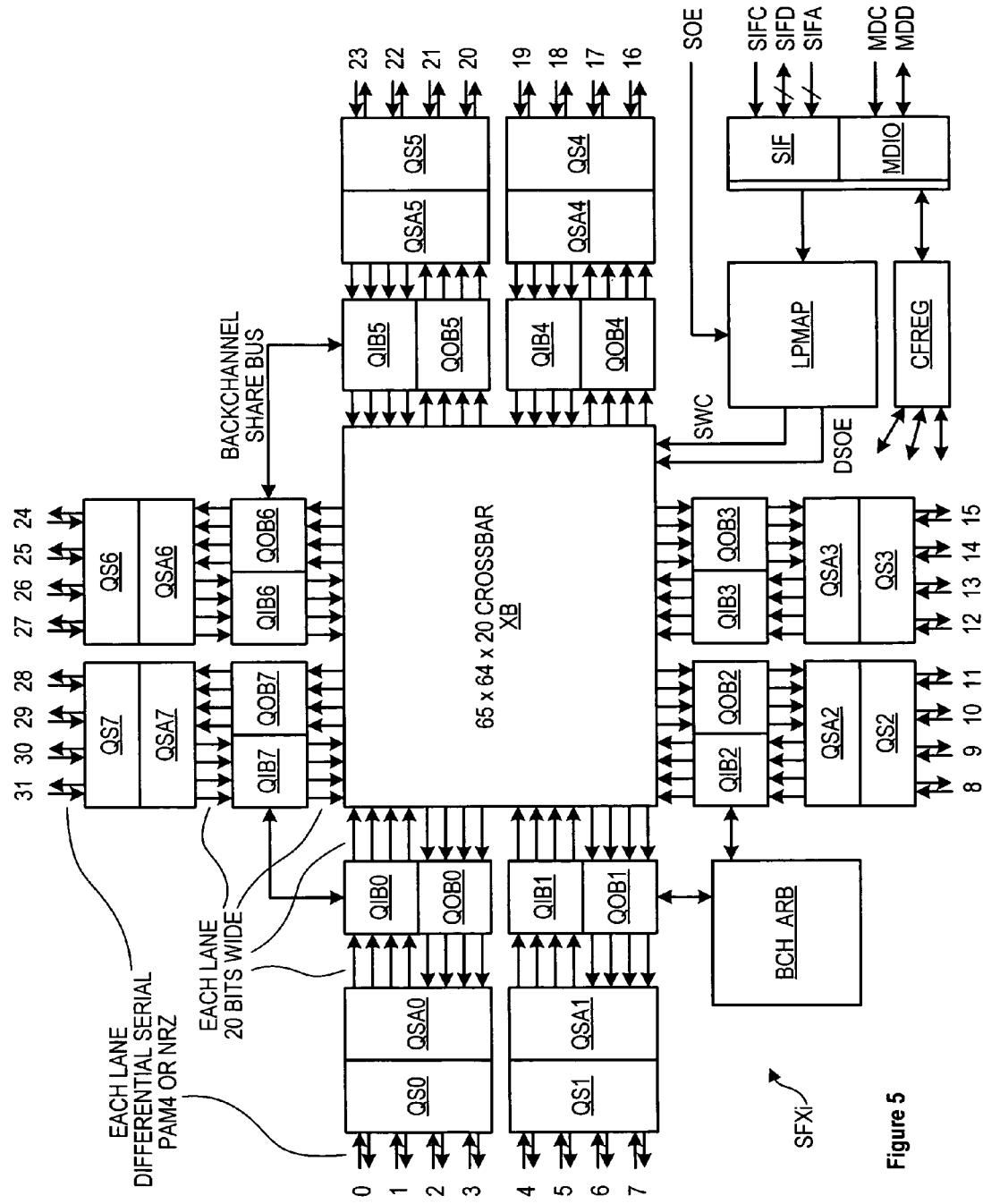
FIG. 5 contains a block diagram for a serial/parallel crossbar switch according to an embodiment.

FIG. 5 contains a high-level block diagram for crossbar switch SFXi, in an embodiment having 32 serial channel inputs (0 . . . 31) and 32 serial channel outputs (0 . . . 31). Eight quad serdes blocks, QS0 to QS7, each handle serialization and deserialization, respectively, for four of the serial channel inputs and four of the serial channel outputs. Each quad serdes QSi communicates respectively with a quad serdes adapter, QSAi. The quad serdes adapter transforms each deserialized serial data lane between a 10-bit wide format used by the quad serdes and a 20-bit wide format, at half the clock rate, used by the crossbar input and output blocks. The quad serdes adapter also transforms backchannel messaging between a Management Data Input/Output (MDIO) two-wire format used to access registers in the quad serdes and a sixteen-bit data+address/control format used to pass backchannel information within SFXi.

Each quad serdes adapter QSAi transmits its ingress channels to a corresponding quad input block QIBi, and receives its egress channels from a corresponding quad output block QOBi. QIBi removes and interprets serial channel control characters/channel information and buffers the packet data for submission to the crossbar XB. QOBi receives packet data from crossbar XB, taking each channel and adding control characters/channel information to create proper frames for transmission out the quad serdes adapter.

Crossbar XB has the capability to place each of 65 20-bit-wide inputs (8 each for each quad input block, plus an "idle character" input), on any/all of 64 20-bit-wide outputs (8 each for each quad output block). The crossbar is programmed by a logical-to-physical mapping block LPMAP, which loads a switch configuration SWC to crossbar XB and then activates the switch configuration with the delayed start-of-epoch signal DSOE.

Crossbar configuration is loaded to SFXi, including LPMAP, through a scheduling interface SIF supporting a scheduling bus. The scheduling bus includes address lines SIFA, bidirectional data lines SIFD, and control lines SIFC. A separate, two-wire MDIO interface is also provided for management loads of LPMAP settings. Both SIF and MDIO also support reads and writes from a set of configuration registers CFREG, which store configuration for SFXi.

Each quad input block/output block QIBi/QOBi supports the routing of backchannel data between the channels of its attached quad serdes QSi. Optionally, each quad input block/output block also communicates over a backchannel share bus with a backchannel arbiter BCH_ARB. The optional backchannel arbiter allows backchannel information received on any deserializer to be passed to any serializer, and backchannel information requested by any deserializer to be transmitted out any serializer.

In the FIG. 5 embodiment, 64 channels are switchable through the crossbar, but only 32 serializers and 32 deserializers exist. 64 channels exist because each serial input and output is capable of carrying two data streams, an "A" data stream and a "B" data stream. Each quad serdes deserializer can be configured to detect either a non-return-to-zero (NRZ) two-level input symbol stream, or a four-level pulse amplitude modulation (PAM4) input symbol stream. Likewise, each quad serdes serializer can be configured to generate either a NRZ or PAM4 output symbol stream. When configured for NRZ operation, only the "A" data stream is active. When configured for PAM4 operation, each 2-bit PAM4 signal consists of one "A" data stream bit and one "B" data stream bit. These data streams pass separately through SFXi, and thus two data streams received by one deserializer can be switched in parallel to the same serializer, or alternately can be split and sent to separate serializers, either as "A" or "B" channels.

Each data stream can also take one of several different formats. One format uses 8b/10b coding for both control and data. Another format uses 8b/10b coding for control, and scrambling for data. A preferred scrambler is an X29X19X1 scrambler, which approximates the signal spectrum of an 8b/10b data stream and thus the 8b/10b control characters used in each epoch frame. In either case, SFXi can perform CRC checks on incoming data streams, generate CRC fields on outgoing data streams, detect backchannel data on incoming data streams ("A" data streams only), and place backchannel data on outgoing data streams ("A" data streams only).

Figure 6:
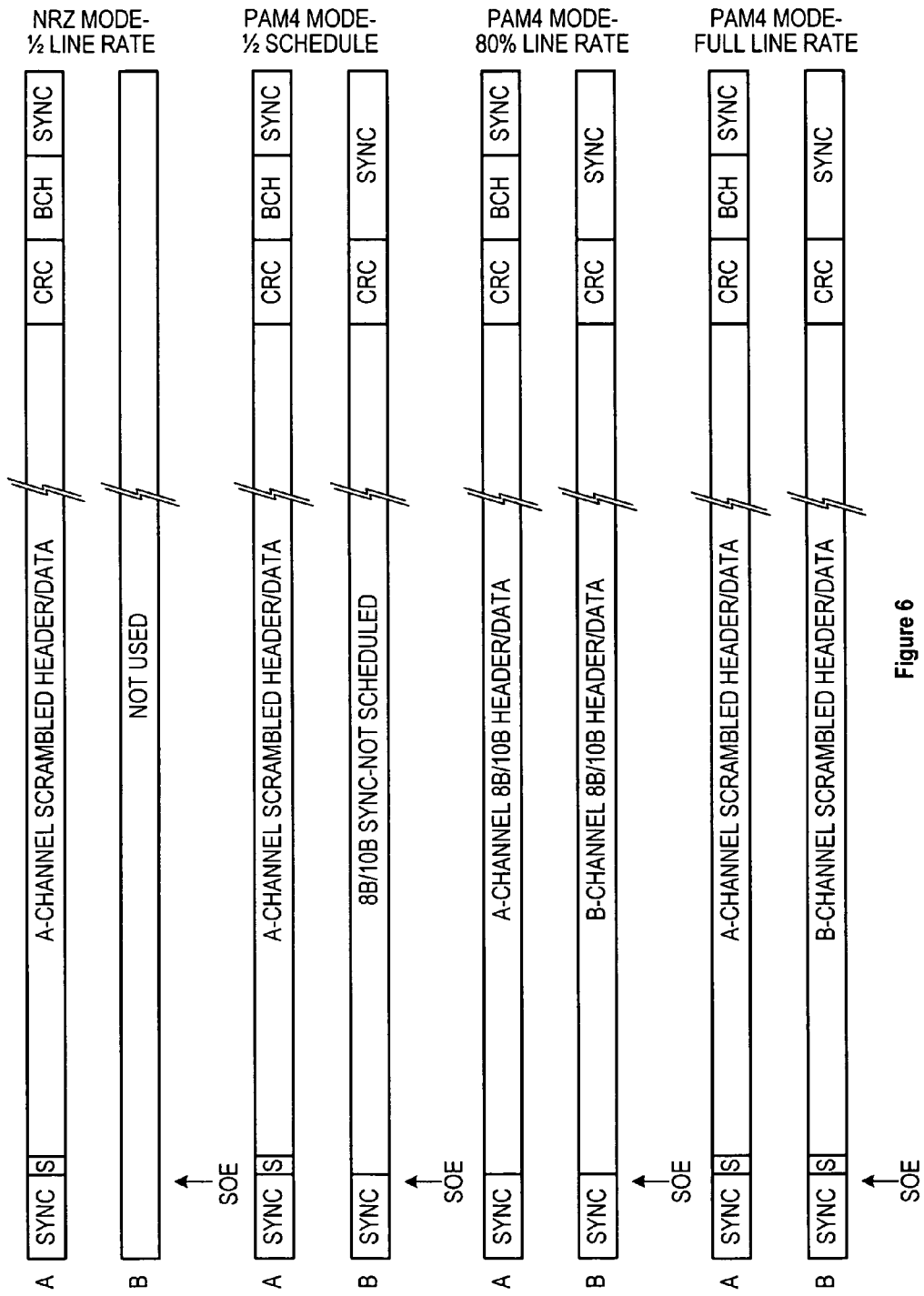
FIG. 6 illustrates several epoch data formats possible with the crossbar switch of FIG. 5.

FIG. 6 illustrates four of the possible serial channel data modes. The first is an NRZ mode at one-half line rate. In this mode, only A channel data is sent to a serializer or detected by a deserializer, and the B channel is unused. The A channel consists of an 8b/10b SYNC preamble, an 8b/10b start character S, scrambled headers/data of a defined data length, an optional 8b/10b CRC record, an optional 8b/10b BCH record, and an 8b/10b SYNC postamble. In one embodiment, each line card crossbar serial channel to an IPP or EPP uses this first format.

The second serial channel data mode shown in FIG. 6 is a half-scheduled PAM4 mode. In this mode, PAM4 signaling is used but only one of the PAM4 channels is scheduled to transmit data. The A-channel follows the same format as used above for NRZ mode. The B channel consists of an 8b/10b SYNC preamble, a continuation of 8b/10b SYNC characters instead of a start character and scrambled headers/data of the defined length, an optional 8b/10b CRC record, and an 8b/10b SYNC postamble.

The third serial channel data mode shown in FIG. 6 is a full-scheduled PAM4 mode transmitting data using 8b/10b coding (and thus only 80% efficient). The A channel consists of an 8b/10b SYNC preamble, A-channel data coded as 8b/10b data characters of the defined length, an optional 8b/10b CRC record, an optional 8b/10b BCH record, and an 8b/10b SYNC postamble. The B channel is similar, but constructed with B-channel data, and without the option of a BCH record.

The fourth serial channel data mode shown in FIG. 6 is a full-scheduled PAM4 mode transmitting data using scrambling. The A channel consists of an 8b/10b SYNC preamble, an 8b/10b start character S, scrambled headers/data of a defined data length, an optional 8b/10b CRC record, an optional 8b/10b BCH record, and an 8b/10b SYNC postamble. The B channel is similar, but constructed with B-channel data, and without the option of a BCH record.

Other permutations are possible within the flexibility described above. The various functional blocks for the FIG. 5 SFXi embodiment are shown in more detail in FIGS. 7-12, and will now be described with reference to the data format of FIG. 6 as necessary.

Figure 7:
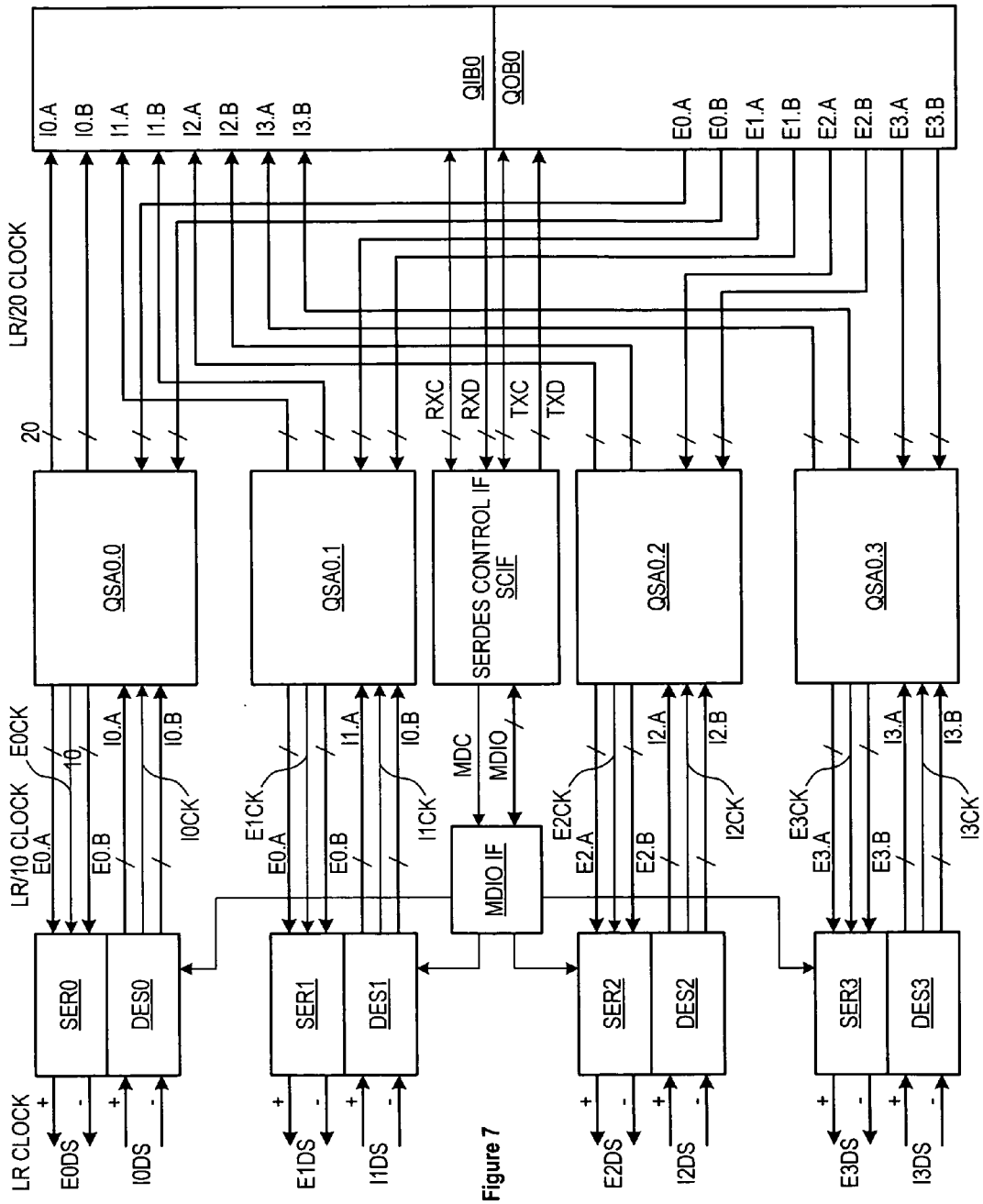
FIG. 7 shows an arrangement of serializer/deserializers, adapters, and input/output blocks for one embodiment of the FIG. 5 crossbar switch.

Turning first to FIG. 7, detailed connections between the components of a quad serdes, a quad serdes adapter, a quad input block QIB0, and a quad output block QOB0 are illustrated. The quad serdes comprises four serializers SER0, SER1, SER2, and SER3, four deserializers DES0, DES1, DES2, and DES3, and an MDIO interface MDIO IF. The quad serdes adapter comprises four subchannel adapters QSA0.0, QSA0.1, QSA0.2, and QSA0.3, and a serdes control interface SCIF.

An ingress differential serial pair IiDS delivers either an NRZ or PAM4 signal to each deserializer DESi. The deserializer detects the clock timing of the received signal from the signal, at the line rate clock frequency LR clock. This frequency is divided by 10 and used as signal IiCK to clock received data buses to a quad serdes subchannel adapter QSA0.i. When the received data is in NRZ format, DESi buffers the received bits and transmits them in parallel 10-bit groups Ii.A to QSA0.i over a 10-bit parallel bus. When the received data is in PAM4 format, DESi buffers the received bits and transmits them in two parallel 10-bit groups Ii.A and Ii.B to QSA0.i, with bits distributed alternately to the two groups.

Each quad serdes subchannel adapter QSA0.i buffers Ii.A and Ii.B into an SFXi clock domain that is approximately LR/20, but may differ slightly from the clock rate of each received channel. As the clock rate is halved, the bus width on each bus is doubled to 20 bits, with two consecutive groups of 10 bits transmitted to QIB0 on each clock cycle.

In the transmit direction, QOB0 transmits 20 bits on Ei.A and 20 bits on Ei.B in parallel at a LR/20 clock rate to QSA0.i. QSA0.i buffers the bits on each 20-bit lane, and transmits the bits over 10-bit lanes to SERi at twice the clock rate (LR/10), referenced from the SFXi clock. A clock EiCK is also supplied to SERi at LR/10 to facilitate reception of the data. When SERi is set to NRZ format, Ei.B is ignored and Ei.A is NRZ-coded at an LR clock rate onto an egress differential serial pair EiDS. When SERi is set to PAM4 format, at each LR clock rate cycle one bit from E0.A and a corresponding bit from EO.B are coded as a PAM4 symbol onto the egress differential serial pair EiDS.

The quad serdes adapter also interfaces with the register group MDIO IF across an MDIO bus. Register group MDIO IF contains registers accessed by each serializer SERi and each deserializer DESi to control serdes operation. Each deserializer also sends messages to the serializer on the other end of its serial channel by writing the messages to designated registers that are polled by SCIF. When SCIF reads a new message from one of these designated registers, it relays the message to QOB0 over a backchannel transmit share bus TXC, TXD, indicating the message and the DESi that created the message. Analogously, when a message is received that is addressed to one of SERi, QIB0 relays the message to SCIF over a backchannel receive share bus RXC, RXD. SCIF uses the MDIO bus to write the message to a designated register in MDIO IF for the target serializer SERi.

Figure 8:
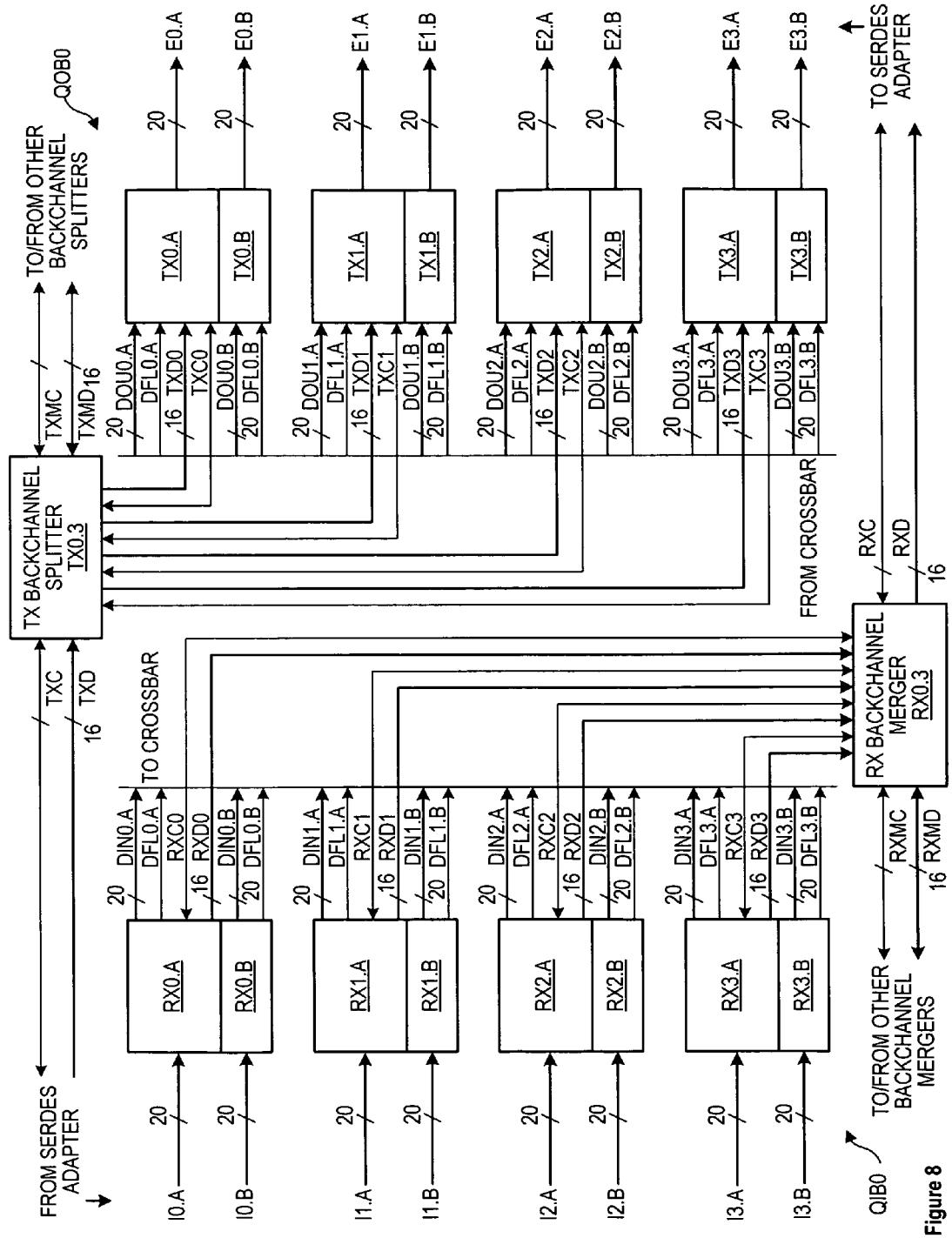
FIG. 8 depicts further details of the arrangement of one of the input/output blocks for one embodiment of the FIG. 5 crossbar switch.

FIG. 8 shows the internal organization of a quad input block QIB0/quad output block QOB0. The quad input block QIB0 comprises eight subchannel receivers RXi.A and RXi.B, i=0, 1, 2, 3, and a receive backchannel merger RX0.3. The quad output block QOB0 comprises eight subchannel transmitters TXi.A and TXi.B, i=0, 1, 2, 3, and a transmit backchannel splitter TX0.3

High-level operation of QIB0 is as follows. Each subchannel receiver RXi.A receives a 20-bit-wide data stream Ii.A from a corresponding quad subchannel adapter QSA0.i (see FIG. 7). RXi.A processes data stream Ii.A, as will be described in conjunction with FIG. 10, to produce a 20-bit-wide data stream DMA and a corresponding set of flags DFLi.A to the crossbar. As an optional part of this processing, RXi.A may detect and extract a backchannel record from a received epoch frame, and transmit the backchannel record to the receive backchannel merger RX0.3 over a backchannel receive bus RXDi (16-bits-wide, data), RXCi (control). Each subchannel receiver RXi.B operates in similar fashion to process a 20-bit-wide data stream Ii.B from QSA0.i, producing a 20-bit-wide data stream DINi.B and a corresponding set of flags DFLi.B to the crossbar. As backchannel records are not carried on the B channel, the B subchannel receivers do not connect to the receive backchannel merger RX0.3.

RX backchannel merger RX0.3 arbitrates between it inputs RXDi, RXCi as needed, accepting backchannel records from the four subchannel receivers. These backchannel records are forwarded by RX0.3 to the appropriate serdes adapter. In one embodiment, backchannel records are only supported when the deserializer receiving the record and the serializer target of the record exist on the same quad serdes. In this case, RX0.3 forwards all backchannel records to its directly attached quad serdes adapter over the receive backchannel bus RXD (16-bits-wide, data), RXC (control). In another embodiment, the serializer target of a backchannel record is allowed to exist on any quad serdes in the device. In this case, receive backchannel merger RX0.3 determines, based on the subchannel receiver which sent a backchannel record, whether the target serializer is on the locally attached serdes adapter or not. If not, the backchannel record is forwarded out a receive backchannel master bus RXMD (16-bits-wide, data), RXMC (control). Other backchannel merger blocks can connect directly to this bus and monitor all traffic directly for traffic of interest. Alternately, a master backchannel arbiter BCH_ARB (FIG. 5) can connect separately to each backchannel merger and arbitrate traffic to and from each.

High-level operation of QOB0 is as follows. Each subchannel transmitter TXi.A receives a 20-bit-wide data stream DOUi.A and a corresponding set of flags DFLi.A from the crossbar. Subchannel transmitter TXi.A processes data stream DOUi.A, as will be described in conjunction with FIG. 10, to produce a 20-bit-wide data stream Ei.A to a corresponding quad subchannel adapter QSA0.i (see FIG. 7). As an optional part of this processing, TXi.A may accept backchannel record data over a backchannel transmit bus TXDi (16-bits-wide, data), TXCi (control) from transmit backchannel splitter TX0.3 and insert the backchannel data as a backchannel record in a transmitted epoch frame. Each subchannel transmitter TXi.B operates in similar fashion to process a 20-bit-wide data stream DOUi.B and a corresponding set of flags DFLi.B received from the crossbar, producing a 20-bit-wide data stream Ei.B to QSA0.i. As backchannel records are not carried on the B channel, the B subchannel transmitters do not connect to the transmit backchannel splitter TX0.3.

Transmit backchannel splitter TX0.3 distributes backchannel record data over its output buses TXDi, TXCi as needed, sending backchannel record data as requested to the four subchannel transmitters. The backchannel record data is received by TX0.3 from an appropriate serdes adapter. In one embodiment, backchannel records are only supported when the deserializer generating the record data and the serializer generating the backchannel record exist on the same quad serdes. In this case, TX0.3 receives all backchannel records from its directly attached quad serdes adapter over the transmit backchannel bus TXD (16-bits-wide, data), TXC (control). In another embodiment, the serializer target of backchannel record data is allowed to exist on any quad serdes in the device. In this case, transmit backchannel merger TX0.3 determines, based on the deserializer that requested a backchannel record, whether the target serializer is on the locally attached serdes adapter or not. If not, the backchannel record is forwarded out a transmit backchannel master bus TXMD (16-bits-wide, data), TXMC (control). Other backchannel splitter blocks can connect directly to this bus and monitor all traffic directly for traffic of interest. Alternately, a master backchannel arbiter BCH_ARB (FIG. 5) can connect separately to each backchannel splitter and arbitrate traffic to and from each.

Figure 9:
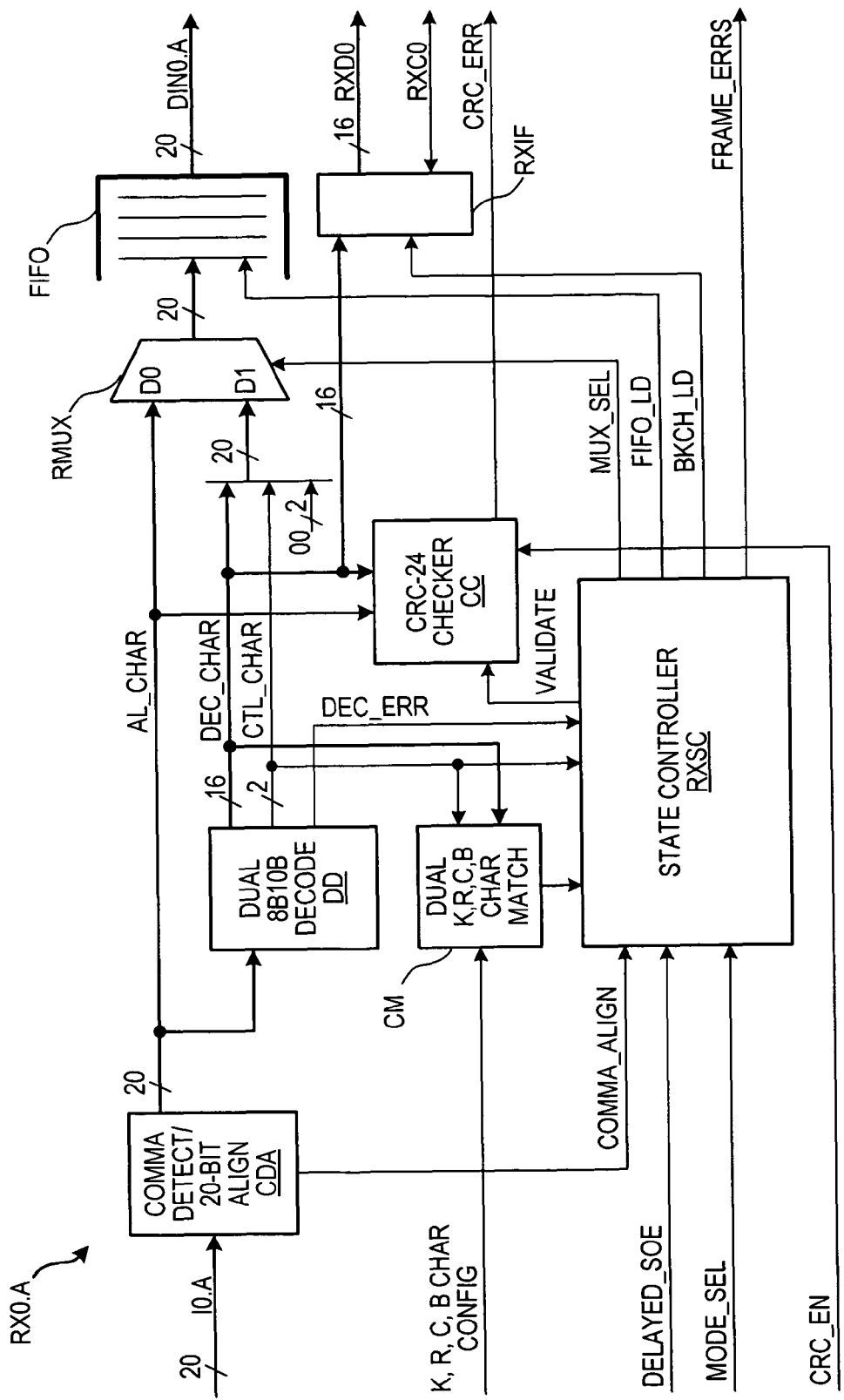
FIG. 9 illustrates a block diagram for one embodiment of a receiver block in the input/output block embodiment of FIG. 8.

FIG. 9 shows the internal logic details of a representative subchannel receiver RX0.A. Subchannel receiver RX0.A receives a 20-bit-wide raw data signal I0.A from a subchannel adapter, configuration inputs for K, R, C, B character configuration, epoch mode selection MODE_SEL, a CRC function enable CRC_EN, and a delayed start-of-epoch timing signal DELAYED_SOE. Subchannel receiver RX0.A transmits crossbar-formatted data DIN0.A and corresponding flags (including a CRC error flag CRC_ERR and a detected frame format error flag FRAME_ERRS) to the crossbar, and receive backchannel data over a receive backchannel bus RXD0, RXC0.

The 20-bit-wide raw data signal I0.A is input to a comma detection/20-bit alignment block CDA. CDA searches for the comma (K+, R+, K−, R−) 8b/10b patterns in the unaligned 20-bit data. When the comma patterns are found, CDA performs a circular shift on the data lanes such that K,R character sets are aligned to start on lane 0 of an output 20-bit bus AL_CHAR. CDA also asserts a signal COMMA_ALIGN to a receiver state controller RXSC when it believes it has achieved lock with the proper data alignment.

State controller RXSC controls the operation of the remaining logical units of subchannel receiver RX0.A, which include: a dual 8b/10b decoder DD, a dual K, R, C, B character matcher CM, a CRC-24 checker CC, a receive data multiplexer RMUX, a receive data FIFO, and a backchannel record interface RXIF. In one mode, RXSC bypasses all data sensing functions by setting a signal MUX_SEL such that RMUX passes the aligned data AL_CHAR from an input D0 of RMUX directly through to the receive data FIFO. In this mode, received 8b/10b control characters, as well as data, whether in 8b/10b or scrambled format, are passed straight through to the crossbar. State controller RXSC also controls when data is pushed through the receive FIFO by asserting a FIFO_LD signal in response to the DELAYED_SOE input.

In another mode, the character stream on AL_CHAR is decoded by the 8b/10b decoder DD, producing dual 8-bit decoded characters DEC_CHAR and a two-bit control character code CTL_CHAR, indicating whether each of the dual characters is a control or a data character. When the decoder encounters an illegal character, it asserts a signal DEC_ERR to state controller RXSC. DEC_CHAR, CTL_CHAR, and a two-bit stuffing value "00" are supplied to an alternate input D1 of RMUX, allowing RXSC to pass a decoded bitstream to the crossbar by selecting RMUX input D1.

The decoded character and control character buses DEC_CHAR, CTL_CHAR are also supplied to character matcher CM. Character matcher CM compares each indicated decoded control character against the configurable character types K, R, C, and B. CM indicates to state controller RXSC whenever a K, R, C, or B control character is located in the data stream.

When CRC_EN is asserted, CRC-24 checker CC tests the data portion of each epoch for transmission errors. State controller RXSC asserts a VALIDATE input to CRC-24 checker CC to instruct the checker to begin accumulating a CRC value based on the aligned character data stream AL_CHAR. The "C" control character indicates the presence of a CRC-24 checksum record in the received data stream. When character match CM detects the presence of a CRC-24 checksum record, is alerts state controller RXSC, which in turn instructs CRC-24 checker CC to stop accumulating a CRC value, and instead compare the accumulated value to the decoded CRC record, which appears on the DEC_CHAR bus over two cycles (the C control character, followed by three 8-bit values that together make up a 24-bit checksum). When the comparison does not produce a CRC match, CRC-24 checker CC asserts an error signal CRC_ERR, which can be used in dynamic crosstalk adjustments as will be explained below.

When character match CM indicates that a backchannel record has been detected after the CRC record (by detecting a "B" control character), state controller RXSC asserts a signal BKCH_LD to the receive backchannel interface RXIF. BKCH_LD causes RXIF to load four decoded characters from the DEC_CHAR bus, including the backchannel record data. RXIF then negotiates with RX0.3 (FIG. 8) to effect the transfer of the backchannel record to the appropriate target.

The B-channel subchannel receivers are similar to the depicted A-channel subchannel receiver, without the backchannel receive/transmit functionality.

Figure 10:
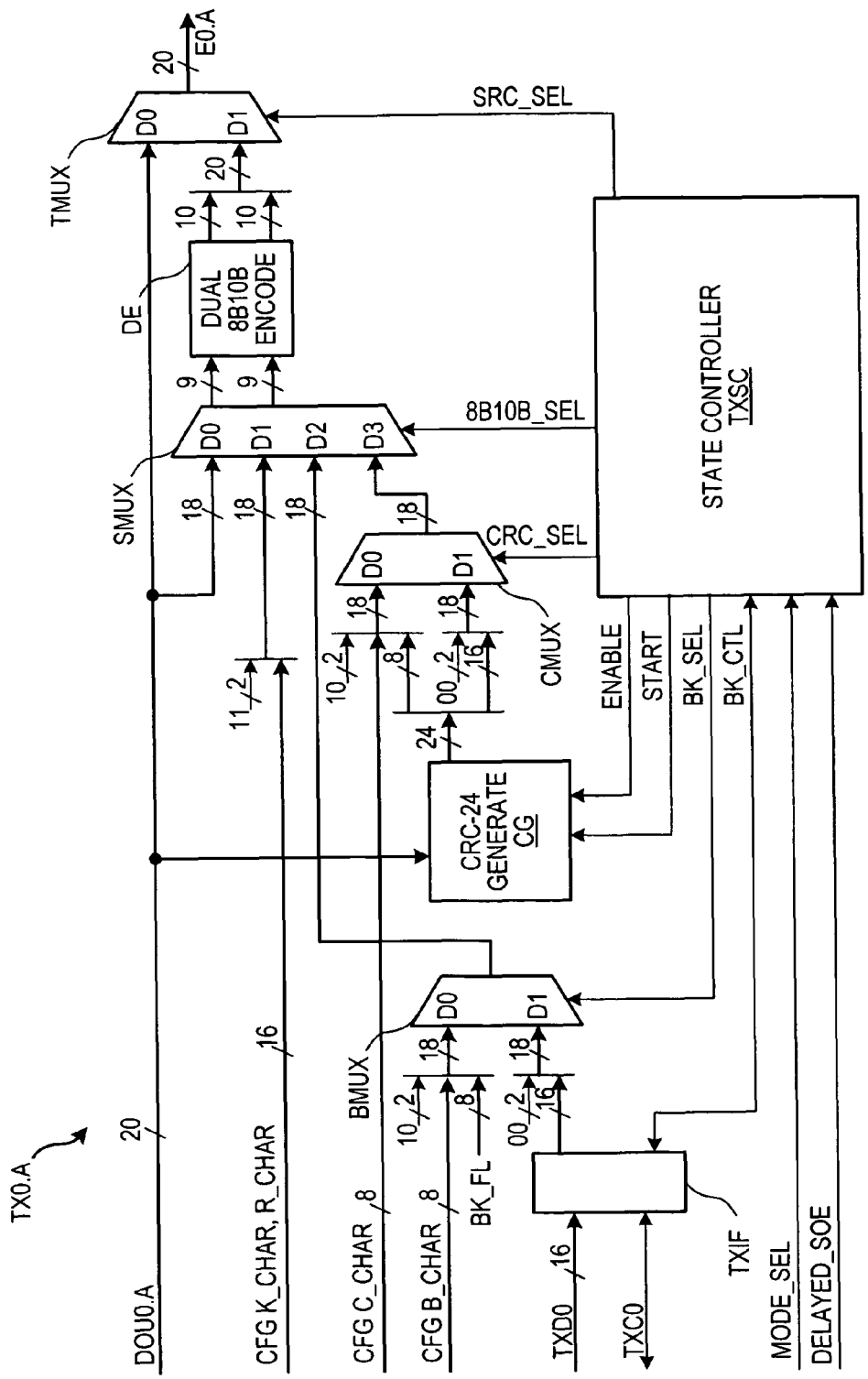
FIG. 10 illustrates a block diagram for one embodiment of a transmit block in the input/output block embodiment of FIG. 8.

FIG. 10 shows the internal logic details of a representative subchannel transmitter TX0.A. Subchannel transmitter TX0.A receives a 20-bit-wide data signal DOU0.A from the crossbar, configuration inputs for K, R, C, B character configuration, an epoch mode selection configuration MODE_SEL, a DELAYED_SOE signal, and optional backchannel record data over a transmit backchannel bus TXD0, TXC0. Subchannel transmitter TX0.A transmits a 20-bit-wide aligned data stream E0.A, which includes continuously concatenated frame data, to a serdes adapter.

A transmit state controller TXSC controls the construction of the A-channel epoch frame data according to the mode selected by MODE_SEL. State controller TXSC selects, using a signal SRC_SEL, one of two inputs, D0 and D1, to a 20-bit×2 multiplexer TMUX to be output on E0.A. At the highest level, transmit state controller TCSC determines based on mode and position in the data stream whether to transmit on E0.A, at each transmit clock period, either 20-bit data received from the crossbar (TMUX input D0), or 20-bit data constructed by the components of TX0.A (TMUX input D1). Thus in one mode, TX0.A merely copies crossbar data onto output E0.A. In other modes, some or all of the crossbar data is transformed within TX0.A, and in still other modes, some of the crossbar data is ignored/replaced with sync sequences and/or CRC records and/or backchannel records created by TX0.A.

Subchannel transmitter TX0.A has the ability to encode 8b/10b data, using a dual 8b/10b encoder DE, as required for any particular mode. Data to be encoded is supplied as two nine-bit inputs to encoder DE, each input including eight bits of data or control word, and one bit indicating whether the input is data or control. Encoder DE performs two 8b/10b encodings in parallel, producing two 10-bit coded characters that are supplied in parallel to TMUX input D1.

The input to encoder DE is the output of an 18-bit×4 source multiplexer SMUX. State controller TXSC, when creating output through decoder SMUX, uses control lines 8B10B_SEL to select one of four inputs D0, D1, D2, D3 to pass to encoder DE. The four inputs include: at D0, 18 bits of DOU0.A; at D1, the control sequence KR, as supplied from configuration values K_CHAR, R_CHAR; at D2, a backchannel record; and at D3, a CRC record.

When the transmitter mode is one that creates a CRC record, state controller TXSC generates a START signal to a CRC-24 generator CG after DELAYED_SOE is enabled. This causes generator CG to begin calculating a CRC value for the data passing across DOU0.A. After the set number of data bits in an epoch have passed through on DOU0.A, state controller TXSC asserts an ENABLE signal to generator CG, causing generator CG to output its calculated 24-bit CRC. State controller TXSC then creates the CRC record in the data using an 18-bit×2 CRC multiplexer CMUX. During the first clock cycle of the CRC record period, an input D0 of CMUX is selected, causing CMUX to output a C control character (the configuration value C_CHAR) and the first 8 bits of the 24-bit CRC. During the second clock cycle of the CRC record period, an input D1 of CMUX is selected, causing CMUX to output the last 16 bits of the 24-bit CRC.

When TX0.A has received a request to create a backchannel record, the backchannel record data is loaded to a backchannel transmit interface TXIF over a backchannel transmit bus TXD0, TXC0. When backchannel transmit data is resident in TXIF, TXIF asserts a backchannel data ready signal BK_CTL to state controller TXSC. When backchannel data is ready, and the appropriate time in the epoch arrives, state controller TXSC creates a backchannel record using an 18-bit×2 backchannel multiplexer BMUX. During the first clock cycle of a two-cycle backchannel record period, state controller TXSC uses a select signal BK_SEL to select an input D0 of BMUX to be passed through SMUX to encoder DE. Input D0 of BMUX is programmed with a B control character (the configuration value B_CHAR) and a backchannel field identifier BK_FL. During the second clock cycle of the backchannel record period, the backchannel record data stored in TXIF is supplied to input D1 of BMUX and selected to be passed through SMUX to encoder DE.

The B-channel subchannel transmitters are similar to the depicted A-channel subchannel transmitter, without the backchannel receive/transmit functionality.

Figure 11:
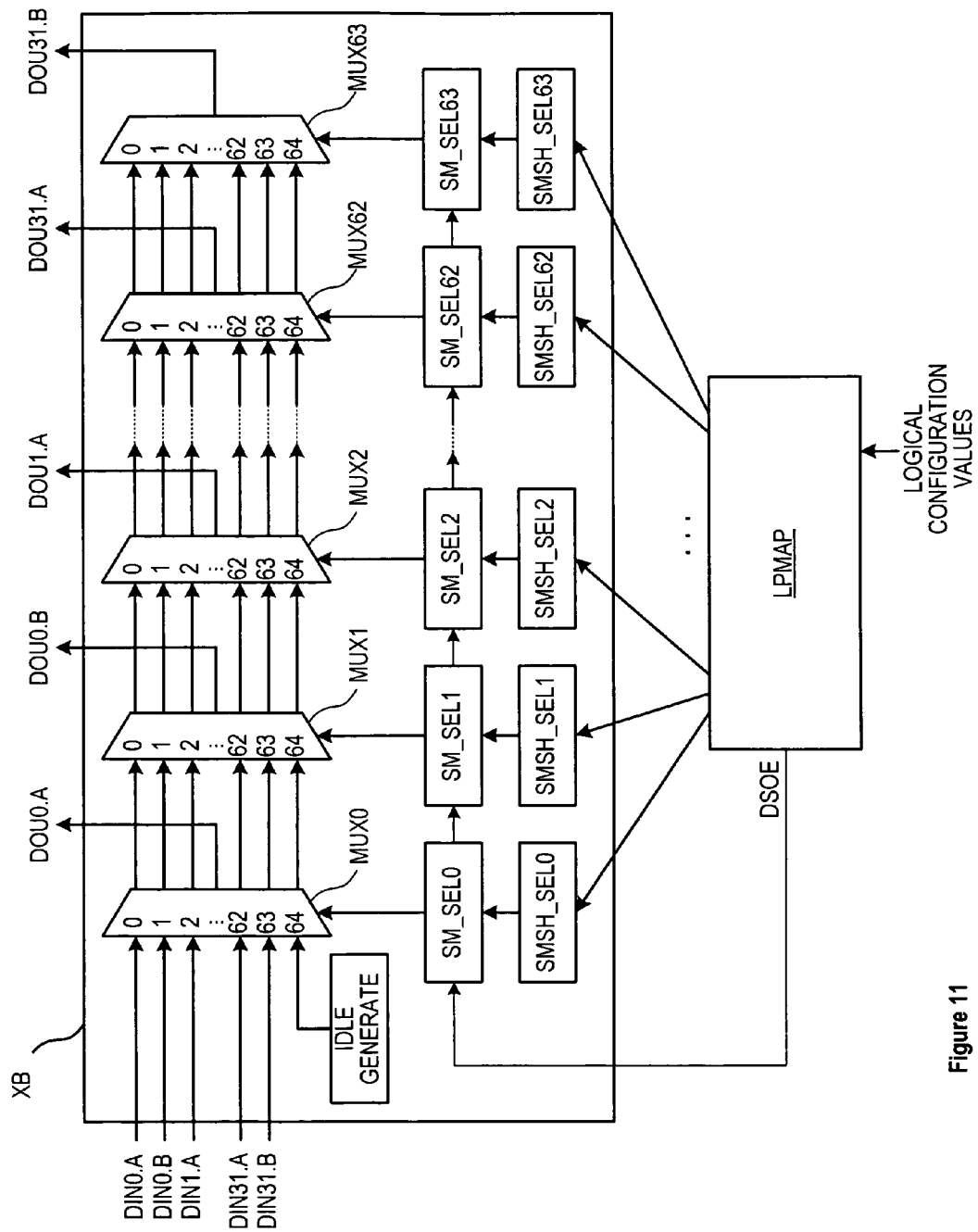
FIG. 11 shows a block diagram for the crossbar core configuration in one embodiment of the FIG. 6 crossbar switch.

FIG. 11 depicts the logical structure for one embodiment of the crossbar XB from FIG. 5. Crossbar XB has 64 20-bit-wide data inputs, DIN0.A to DIN31.A and DIN0.B to DIN31.B. Similarly, crossbar XB has 64 20-bit-wide data outputs, DOU0.A to DOU31.A and DOU0.B to DOU31.B. Crossbar XB can be programmed to switch any of the 64 inputs to any of the 64 outputs, and can switch the same input to multiple outputs. Further, crossbar XB can be programmed to switch a $65^{th}$ data source, essentially a KR idle generator, to any of the 64 outputs. In this embodiment, the switching is performed by 64 20-bit×65 multiplexers, MUX0 to MUX63, controlled by 64 7-bit select registers, SM_SEL0 to SM_SEL63. Each select register SM_SELi is paired with a corresponding shadow select register SMSH_SELi. The logical-to-physical mapper LPMAP actually loads the configuration of each MUXi for the following epoch to the corresponding shadow select register SMSH_SELi. At the start of each epoch, LPMAP asserts the signal DSOE, causing all select registers to simultaneously load the values stored in their associated shadow select registers, allowing all multiplexers to switch to their new inputs simultaneously.

Figure 12:
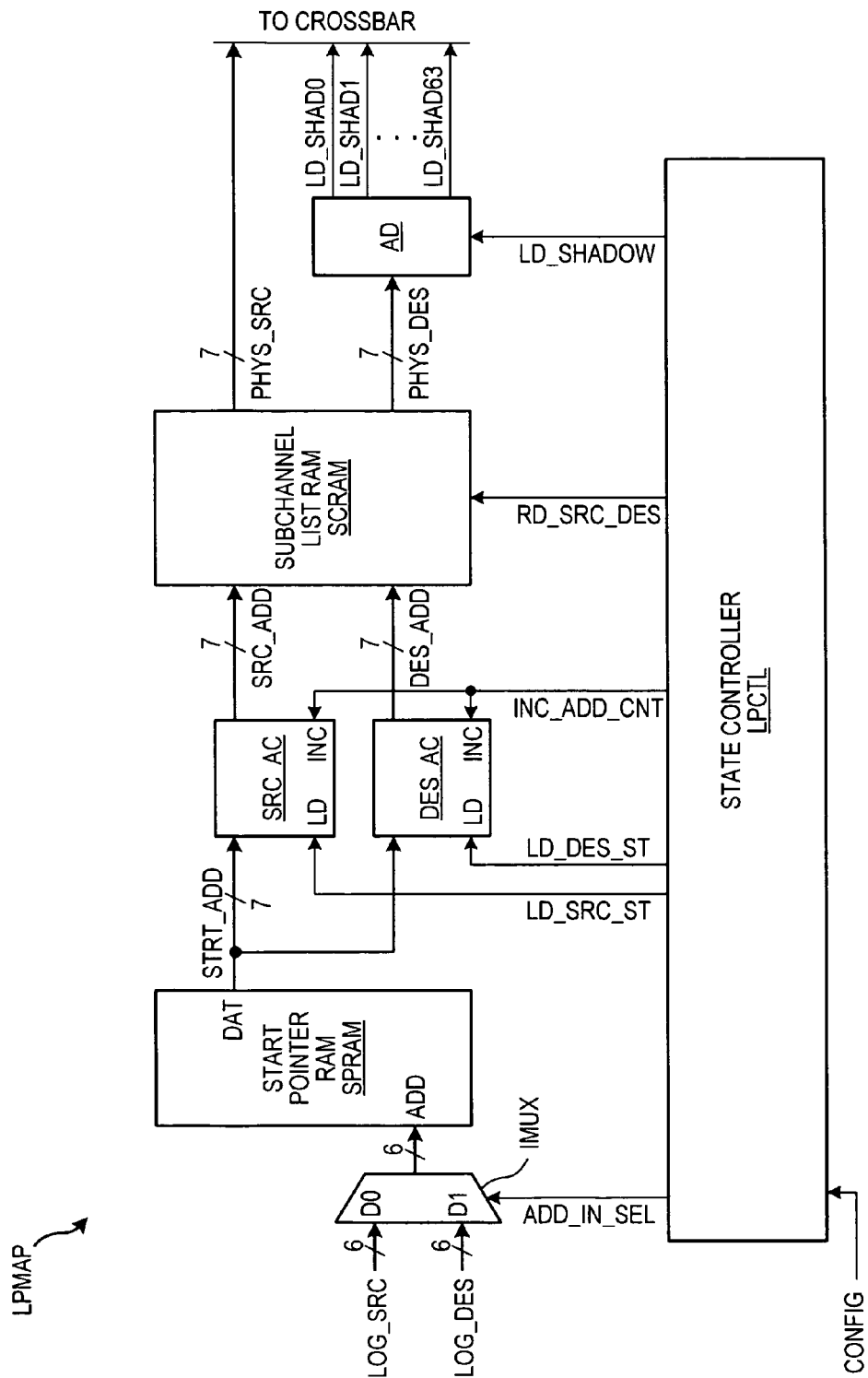
FIG. 12 details one embodiment for a logical-to-physical port mapper in one embodiment of the FIG. 6 crossbar switch.

FIG. 12 illustrates one embodiment of a logical-to-physical mapper LPMAP. The purpose of the logical-to-physical mapper is to allow the scheduling operation to work in a logical domain while the crossbar works in a physical channel domain. By incorporating a translation mapping between the two domains, LPMAP allows for static and dynamic configuration of the physical channels to best support physical channel performance in the particular slot that a card is inserted, preferably transparent from scheduling.

The FIG. 12 LPMAP embodiment comprises an input logical address multiplexer IMUX, a start pointer RAM (Random Access Memory) SPRAM, two address counters SRC_AC and DES_AC, a subchannel list RAM SCRAM, an address decoder AD, and a state controller LPCTL. LPMAP accepts logical source addresses LOG_SRC and logical destination addresses LOG_DES, translating them respectively into physical source addresses PHYS_SRC and shadow register load selectors LD_SHADi for the FIG. 11 shadow select registers.

Start pointer RAM SPRAM is addressable using either a logical source address or a logical destination address. Logical source addresses are supplied to an input D0 of IMUX, and logical destination addresses are supplied to an input D1 of IMUX. The output of IMUX feeds the address input ADD of the start pointer RAM SPRAM. State controller LPCTL determines whether a source or destination address is supplied to SPRAM by controlling a multiplexer select signal ADD_IN_SEL to IMUX.

Start pointer RAM SPRAM stores a start address for each possible logical source and destination address. When a logical address is supplied to the ADD input of SPRAM, SPRAM outputs the start address as STRT_ADD. State controller LPCTL loads STRT_ADD to either source address counter SRC_AC or destination address counter DES_AC, using the load signals LD_SRC_ST and LD_DES_ST, respectively. For instance, when a logical source address is selected at IMUX, state controller LPCTL will load the corresponding start address supplied by SPRAM to SRC_AC.

Subchannel list RAM SCRAM stores physical source addresses and physical destination addresses. Each physical source address corresponds linearly to one of the 65 input data streams to the crossbar (FIG. 11). Each physical destination address corresponds linearly to one of the 64 output data streams of the crossbar (FIG. 11). A logical address, however, can simultaneously address anywhere from 1 to 64 of these physical addresses, and need not have any type of linear relationship with the physical addresses. This is accomplished in this embodiment by storing as a contiguous group all physical addresses corresponding to a given logical address. The start pointer RAM specifies the starting address for the group, which allows LPMAP to retrieve the first physical address of the group.

In one mode of operation, LPCTL uses a logical source address to retrieve a starting address for a physical source address group from SPRAM, which is loaded into source address counter SRC_AC. LPCTL then uses a logical destination address to retrieve a starting address for a physical destination address group from SPRAM, which is loaded into destination address counter DES_AC. LPCTL then uses command signals RD_SRC_DES to cause subchannel list RAM SCRAM to perform two reads. The first read uses the value SRC_ADD stored in the source address counter to return a physical source address PHYS_SRC. The second read uses the value DES_ADD stored in the destination address counter to return a physical destination address PHYS_DES. LPCTL then asserts a control line LD_SHADOW to address decoder AD, causing decoder AD to decode PHYS_DES to one of 64 outputs, LD_SHAD0 to LD_SHAD63. When decoder AD asserts the output LD_SHADi corresponding to PHYS_DES, it causes a corresponding shadow register SMSH_SELi (see FIG. 11) to load the address appearing on PHYS_SRC.

When the physical source address group comprises more than one physical address, state controller LPCTL steps through the group by incrementing the address counters until all physical addresses in the logical group have been programmed into their corresponding shadow registers. After the first shadow register is loaded as described above, LPCTL strobes a control signal INC_ADD_CNT to cause both address counters to increment their addresses. A new SCRAM read cycle/shadow register load cycle programs the next physical address pairing in the list. This process repeats until all subchannel physical addresses in the group are programmed. The number of physical addresses can be determined in one of several ways: it can be a constant specified for the chassis configuration, e.g., loaded over a CONFIG bus to LPCTL at system startup; it can be stored in SPRAM with the start address, and supplied to LPCTL for each group; each group in SCRAM can terminate with a specially defined "NULL" physical address that does not correspond to any physical address, signaling LPCTL that the end of the group has been reached; different ranges of logical or start pointer addresses can correspond to different group lengths, such as 1, 2, 4, 8, etc. Other techniques are certainly possible. Alternately, LPMAP can be implemented with a content-addressable memory (CAM) that stores multiple entries for each logical address, and is programmed to return multiple CAM hits sequentially when accessed with a logical address.

With a description of the crossbar configuration capabilities complete, the following Figures illustrate how this crossbar and chassis configuration can be used to advantage in controlling crosstalk, both statically and dynamically. In a system design according to a described embodiment, each line card connects to each switch fabric card through at least one electrical differential serial channel (an ingress channel) that connects a serializer on the line card crossbar to a deserializer on the switch fabric card crossbar. Each line card also connects to each switch fabric card through at least one other electrical differential serial channel (an egress channel) that connects a serializer on the switch fabric card crossbar to a deserializer on the line card crossbar.

Figure 13:
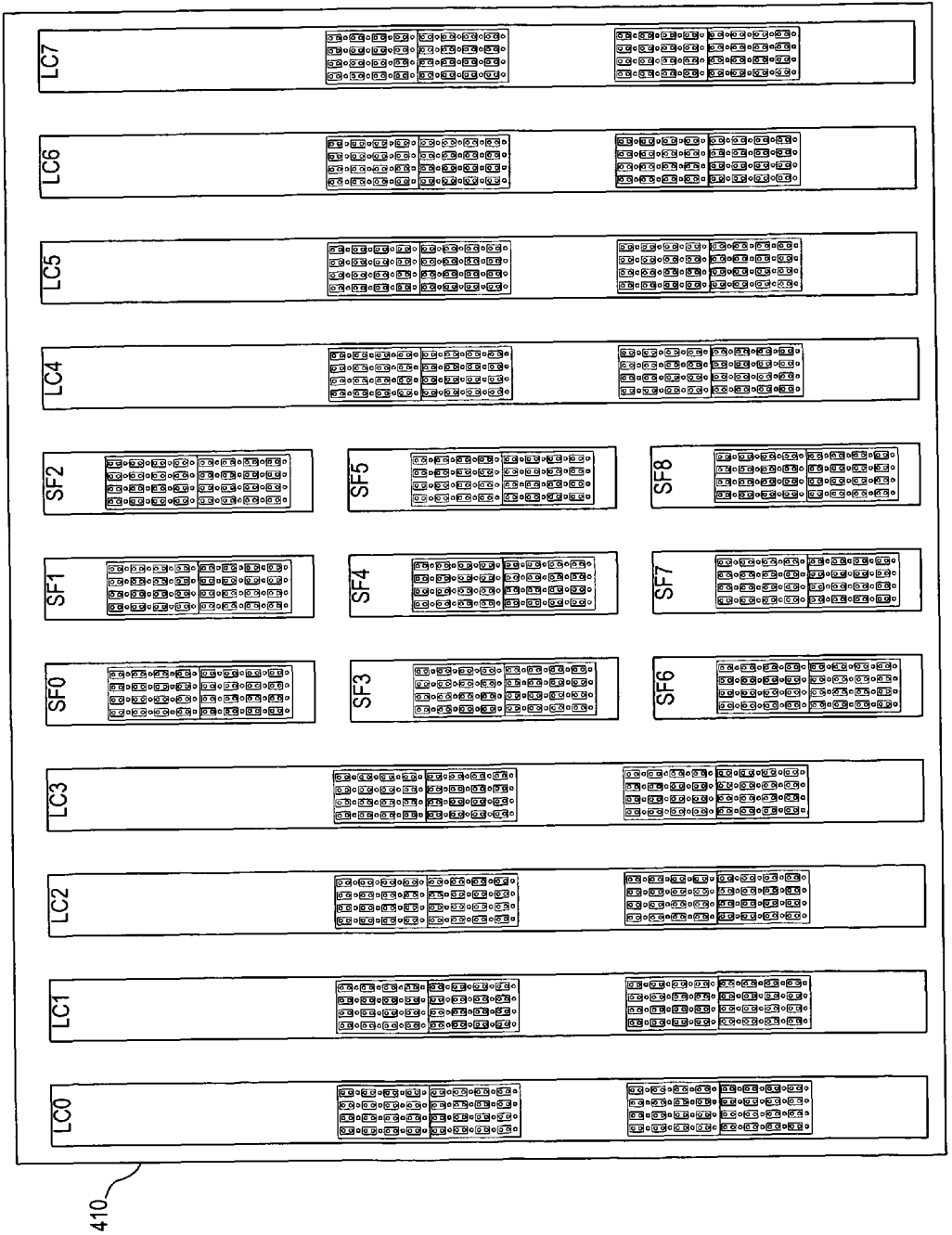
FIG. 13 depicts, in plane view, an exemplary backplane layout for which the described embodiments are useful.

FIG. 13 shows an exemplary top plan view of a backplane 410 with eight line card mounting slots, LC0 to LC7, and nine switch fabric card mounting slots, SF0 to SF8. If this example were to use the FIG. 5 32-serial-channel-in/32-serial-channel-out crossbar, four ingress serial channels and four egress serial channels can be provisioned between each line card slot and each switch fabric slot. This results in (8 line cards)×(9 switch fabric cards)×(8 channels)=576 differential serial pairs on the backplane to support data communications, plus control communication channels. These differential serial pairs may be of vastly different lengths—consider the distance between slot LC0 and slot SF2 as compared to the distance between slot LC3 and slot SF3. This distance is a strong contributor to attenuation and sensitivity to crosstalk, but is only part of the overall channel to be considered for each serial pair.

Figure 14:
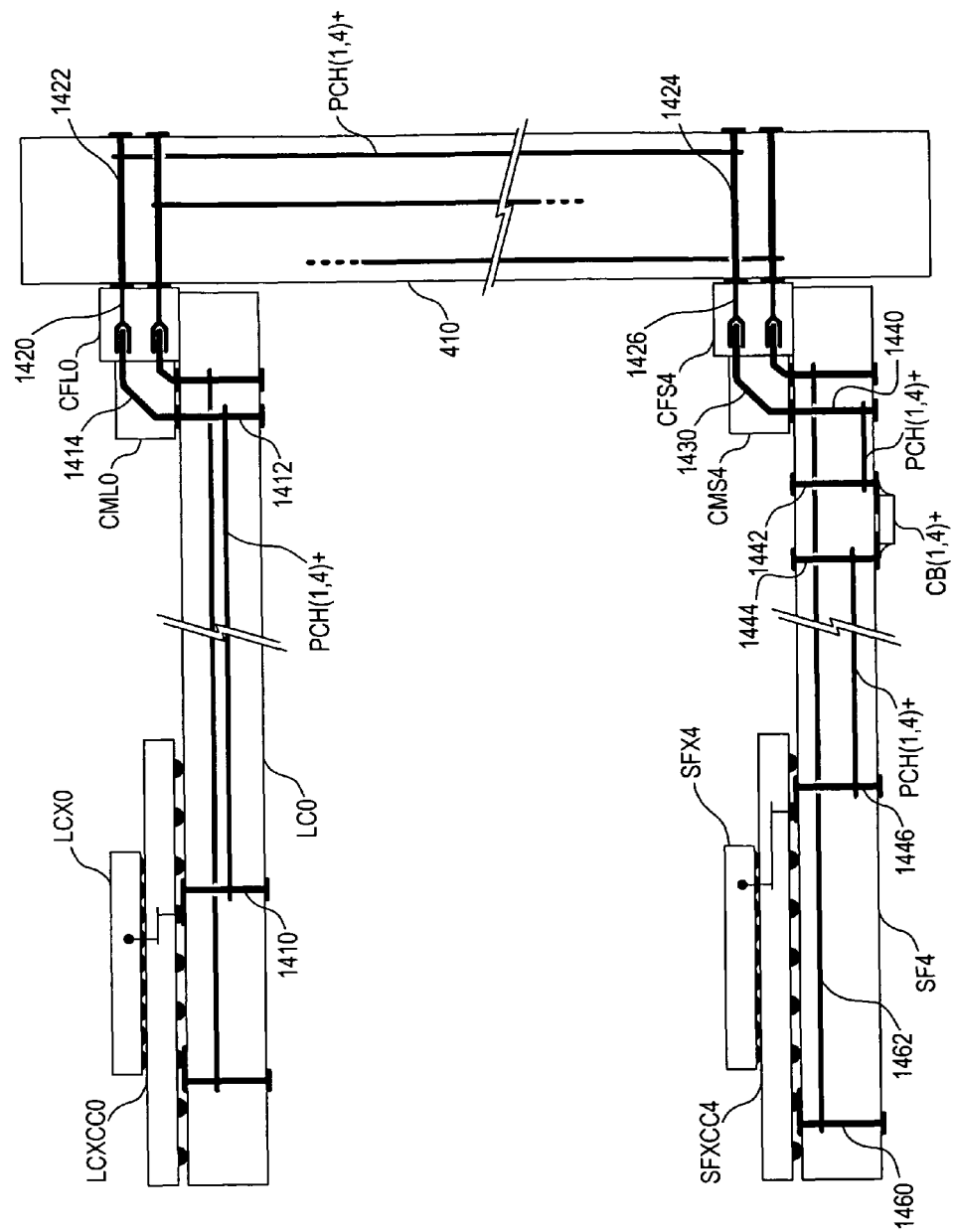
FIG. 14 shows, from a board edge view, various components of a serial channel connecting a line card crossbar switch circuit to a switch fabric crossbar switch circuit according to an embodiment.

The channel response for the channel formed between each serializer/deserializer pair is a function of the individual responses of the various components of the channel path. For instance, FIG. 14 shows various components of one conductor PCH(1,4)+ of a differential serial channel between a line card crossbar switch LCX0 on a line card LC0 and a switch fabric crossbar switch SFX4 on a switch fabric card SF4. Line card LC0 contains a male connector CML0 that mates with a female connector CFL0 on a backplane 410. Switch fabric card SF4 contains a male connector CMS4 that mates with a female connector CFS4 on backplane 410.

An entire channel conductive path between a serializer on LCX0 and a deserializer on SFX4 is depicted. LCX0 and SFX4 are application-specific integrated circuits (ASICs), mounted respectively on chip carrier packages LCXCC0 and SFXCC4 (various structural/heat dissipative elements of such a package are not shown for clarity). Each chip carrier package, in turn, contains for instance a ball grid array (BGA) used to make electrical connections to a respective circuit board. Thus a serializer signal PCH(1,4)+ originating on LCX0 connects to a chip carrier contact on chip carrier LCXCC0, which connects in turn through signal routing layers within the chip carrier to a contact of the BGA. This BGA contact is soldered to a pad on LC0, which connects in turn to a through hole 1410, which connects in turn to a trace on an internal layer of LC0. The trace connects to a second through hole 1412, into which a pin 1414 of connector CML0 is press-fit. The CML0 connector is integral with an internal connector pin on CML0, which mates with a complementary internal connector socket 1420 on CFL0. The internal connector socket 1420 on CFL0 is integral with a pin of connector CFL0, the pin 1420 being press-fit in a through hole 1422 of backplane 410. The through hole 1422 connects to a trace on an internal layer of backplane 410, which connects in turn to a similar through hole 1424 underlying female connector CFS4. The connections used to complete the channel are now reversed from those on LC0, as PCH(1,4)+ next passes through a pin/connector socket 1426 on CFS4, a pin/pin 1430 on CMS4, through holes and traces on circuit board SF4, chip carrier SFXCC4, and finally to switch fabric ASIC SFX4.

One additional pad-mounted component and two additional through holes are added on the egress path to allow mounting of a DC blocking capacitor CB(1,4)+ in the path between connector CMS4 and SFXCC4. The signal path passes from pin 1430 into a through hole 1440, then through a trace to a through hole 1442, which carries the signal to the back surface of circuit board SF4, where a mounting pad allows electrical connection to one electrode of CB(1,4)+. A second mounting pad allows electrical connection of the other electrode of CB(1,4)+ to a through hole 1444, which carries the signal back to another internal trace to a through hole 1446 underlying chip carrier SFXCC4.

A similar and largely parallel path is formed for the differential-paired conductive channel PCH(1,4)– (not shown). Together, PCH(1,4)+ and PCH(1,4)–, with reference planes (not shown) where the channel conductors are formed as stripline or microstrip, form a complete differential serial channel.

Each portion of the channel can be modeled separately, with the overall channel response being the sum of the responses of all channel segments. Many of these response components will differ from channel to channel. For instance, a second conductor 1462, connected at one end to a through hole 1460, is shown on circuit board SF4. Not only is conductor 1462 longer, but through hole 1460 may have less favorable (or more favorable, if backdrilled) reflection characteristics than through hole 1446, for example. Also considering the connector blocks, not all connectors experience the same attenuation or crosstalk aggressor configuration. Crosstalk effects are particularly pronounced anywhere two differential pairs run parallel to each other on the same conductive layer for a significant distance, at the board connectors and underlying through holes, and at the through holes underlying the chip carriers, where the conductors are packed with high density.

In prior art card configurations, there was little to no advantage in characterizing the differences between the various serial channels on a switch fabric card or line card other than to estimate a "worst case", as the majority of the channel loss variations occur on the backplane, and differ considerably based on the slot in which a card is inserted. In the embodiments described below, however, it can be advantageous to characterize these differences. Furthermore, it may also be advantageous to design the card trace routing, routing layers, and connector layout so that channel responses, card-wise, are considerably better for some channels than others. For instance, channels mapping to chip carrier ball grid locations closer to the card edge connector can be combined with favorable routing layers (e.g., near the bottom of the card to minimize through hole reflections), more direct routing, and more favorable connector pinouts. Channels mapping to chip carrier ball grid locations farther from the card edge connector can be combined with less favorable routing layers, layer-swapping if necessary, and less favorable connector pinouts from a crosstalk potential and attenuation perspective. "Disfavored" channels are not purposely degraded more than necessary to allow at least some "favored" channels to be of the highest possible response. This type of mapping is counter-intuitive, however, as generally a designer would strive to make all card channels of similar channel response. Further, in one embodiment, connector pinouts are arranged such that "better" card channels are interspersed with the "worse" card channels, such that better and worse card channels exist along the connector.

Figure 15:
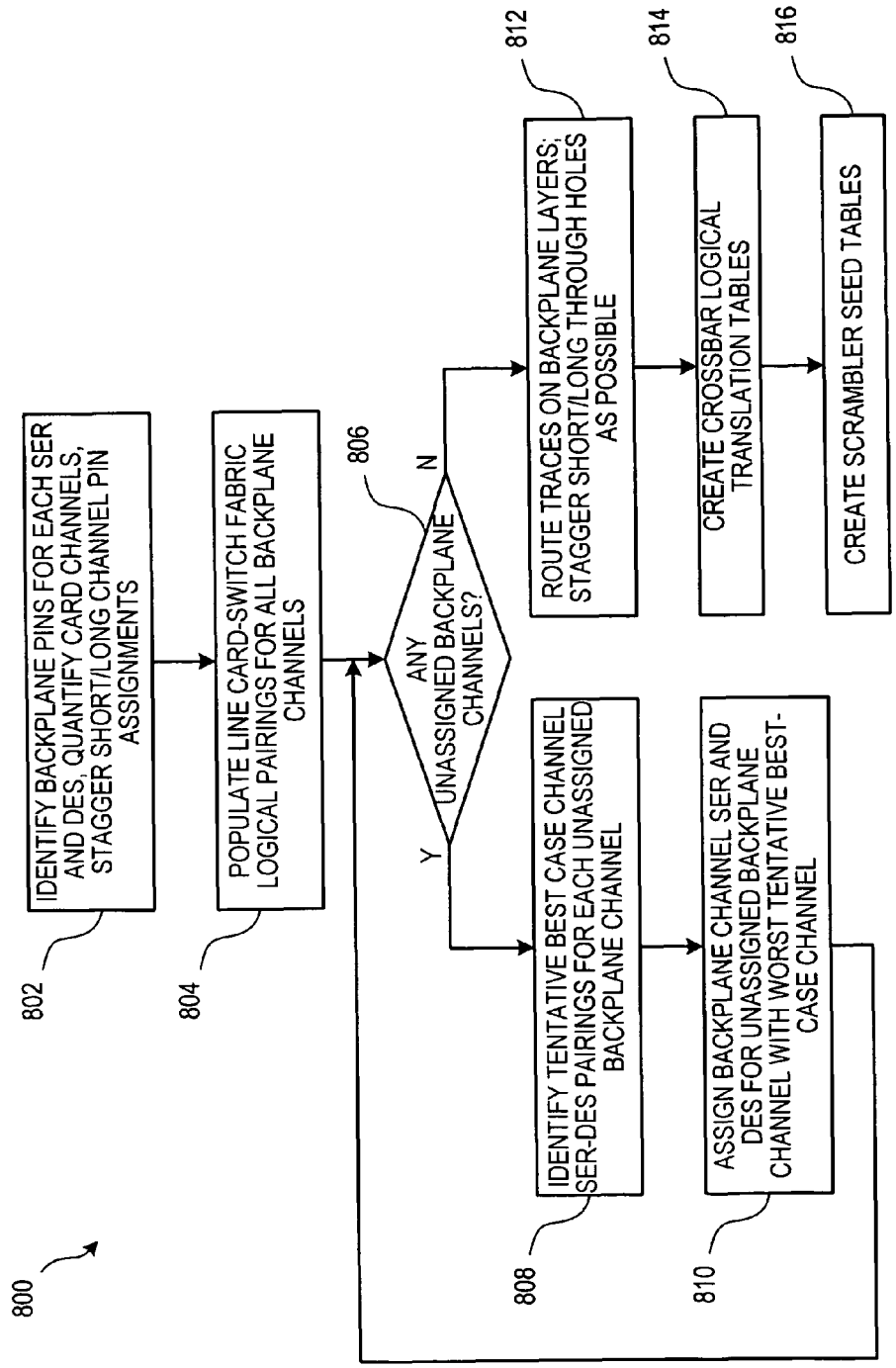
FIG. 15 contains a flowchart for a decision process, according to an embodiment, for selecting serializer-deserializer pairings in a backplane layout.

FIG. 15 contains a flowchart 800 for a method of designing a backplane for crosstalk improvement. Block 802 contains the tasks described above, i.e., switch fabric and line card design, preferably including constructing channels of varying quality, quantifying the characteristics of each card channel, and staggering short and long channels as far as connector pin assignments are concerned. Although it is not necessary to every embodiment that the switch fabric cards and line cards be designed this way, it is preferable that if channels of varying quality exist, these differences at least be measured or estimated to aid in the assignment of backplane channels.

At block 804, backplane serial channel trace routing begins. A logical pairing instance corresponding to each backplane serial channel is created. At this point, the logical channels are not associated with any particular connector pins, serializers, or deserializers, although each serializer and each deserializer is associated with a pin on the backplane.

The method then proceeds to an iterative procedure consisting of a decision block 806 and two channel assignment blocks 808 and 810. This procedure iterates until all logical pairing instances have been assigned a connector pin pair on each end. First, at block 808, the process scans, on behalf of each unassigned backplane serial channel, the remaining unassigned pins at the unassigned channel's corresponding line card connector block and switch fabric card connector block. When the unassigned channel is an ingress channel, the connector pin pairs considered at the line card connector block are those connected to a line card serializer that has not already been assigned, and the connector pin pairs considered at the switch fabric card connector block are those connected to a switch fabric card deserializer that has not already been assigned. When the unassigned channel is an egress channel, deserializer pin pairs are considered at the line card connector block and serializer pin pairs are considered at the switch fabric card connector block.

Each possible unassigned connector pin pair solution is considered for overall end-to-end channel response, including the channel response for that solution's line card channel, the channel response for that solution's switch fabric card channel, and an estimated backplane channel response for the solution. As the available solutions are considered for each unassigned backplane channel, the best possible solution is identified, irrespective of the other unassigned backplane channels. During this phase, potential solutions may be ruled out for excessive crosstalk—this may occur, for instance, when the solution results in neighbor backplane connector pairs on both ends that are already assigned to the same pre-assigned channel.

Once a best possible solution is identified for all remaining unassigned backplane channels, block 810 selects one (or possibly several, if non-conflicting) of the backplane channels for assignment. At this time, the channel selected for assignment is the channel with the worst best-case solution. For example, early in the assignment process, the channel selected for assignment will likely be one with a long, difficult run, such as from LC0 to SF2 or SF8 (FIG. 13 example) or from LC7 to SF0 or SF6. This channel will select a quite favorable channel and pinout on both the line card slot and switch fabric card slot. Late in the assignment process, assignments will be completed for the closest line and switch fabric cards, such as LC3 and SF3. At this point, the most favorable card channels and pin positions will be taken, but even suboptimal connections between very close cards will still be better than the best possible routing between distant cards.

After all backplane channels have been assigned, decision block 806 branches to block 812, where trace routing is finalized. As possible, some trace layers or endpoints may be shifted slightly to allow backplane through holes to be tuned. Preferably, connector through hole pairs connecting to backplane layers near the bottom of the board are interspersed with connector through hole pairs connecting to backplane layers near the top of the board, allowing backdrilling of every other conductor pair to minimize crosstalk at this location.

At block 814, backplane trace routing is complete. A set of crossbar logical translation tables are generated for each crossbar, based on the now-known physical channel assignment. These tables will be used, e.g., by a management processor to configure the LPMAP memories in each crossbar switch when the system is booted or when a card is inserted in an already-operating chassis. Logical channel assignment is preferably set such that each line card crossbar performs a different mapping than each other line card crossbar, to avoid scrambler crosstalk synchronization, as will be addressed next.

At block 816, scrambler seed tables are generated for the chassis. Preferably, when scrambling is used, a variety of seeds are used to lessen a synchronization effect wherein many crosstalk aggressors of a particular crosstalk victim use the same seed, and thus scrambled data sequences at each epoch that start out similarly and reinforce each other at the victim. For instance, the following five seeds, as specified in hexadecimal (h) notation, can be assigned to the logical channels for an X29X19X1 scrambler:

Seed 1=09249249h
Seed 2=14924924h
Seed 3=0A492492h
Seed 4=05249249h
Seed 5=12924924h By staggering the seed assignments, it is possible to arrange channels such that at each connector block, the neighbor aggressor channels for most, or all, serial channels all use different seeds. For instance, with 10 ingress channels per logical pipe and 10 egress channels per logical pipe, the ingress processors and egress processors can use a seed assignment (1, 2, 3, 4, 5, 1, 2, 3, 4, 5) at their serial ports. The line card crossbars and switch fabric crossbars are free to change the assignment of these logical subchannels to physical subchannels such that seed appearances are staggered at both the line card connectors and the switch fabric card connectors, as long as the seed assignment is placed back in the proper order before the serial channels are sent to the egress processors. This may not be strictly achievable for each possible backplane configuration, but with five seeds one can get close. It becomes easier with more seeds (e.g., ten seeds for ten ingress channels and ten egress channels).

The ability to arrange scrambler seeds, view the effect of the arrangement and detect potential problems, and then try a new arrangement is particularly aided by the availability of logical-to-physical mapping at both ends of both the ingress and egress serial channels. Without the ability to perform logical mapping at multiple points, achieving this goal requires the selection of N×M orthogonal seeds that are otherwise suitable, where N is the number of line cards and M is the number of ingress serial channels per line card. Further, because the seeds used to generate the data received by each egress traffic manager in this alternate approach would vary depending on the data sender, the egress traffic managers would be required to change seeds each epoch. This is possible, but results in a large number of changing neighbor seed pairings, depending on switch configuration on each epoch. Should a small number of these prove to produce unacceptable crosstalk, it would be difficult to pinpoint the problem due to the large number of combinations.

Figure 16:
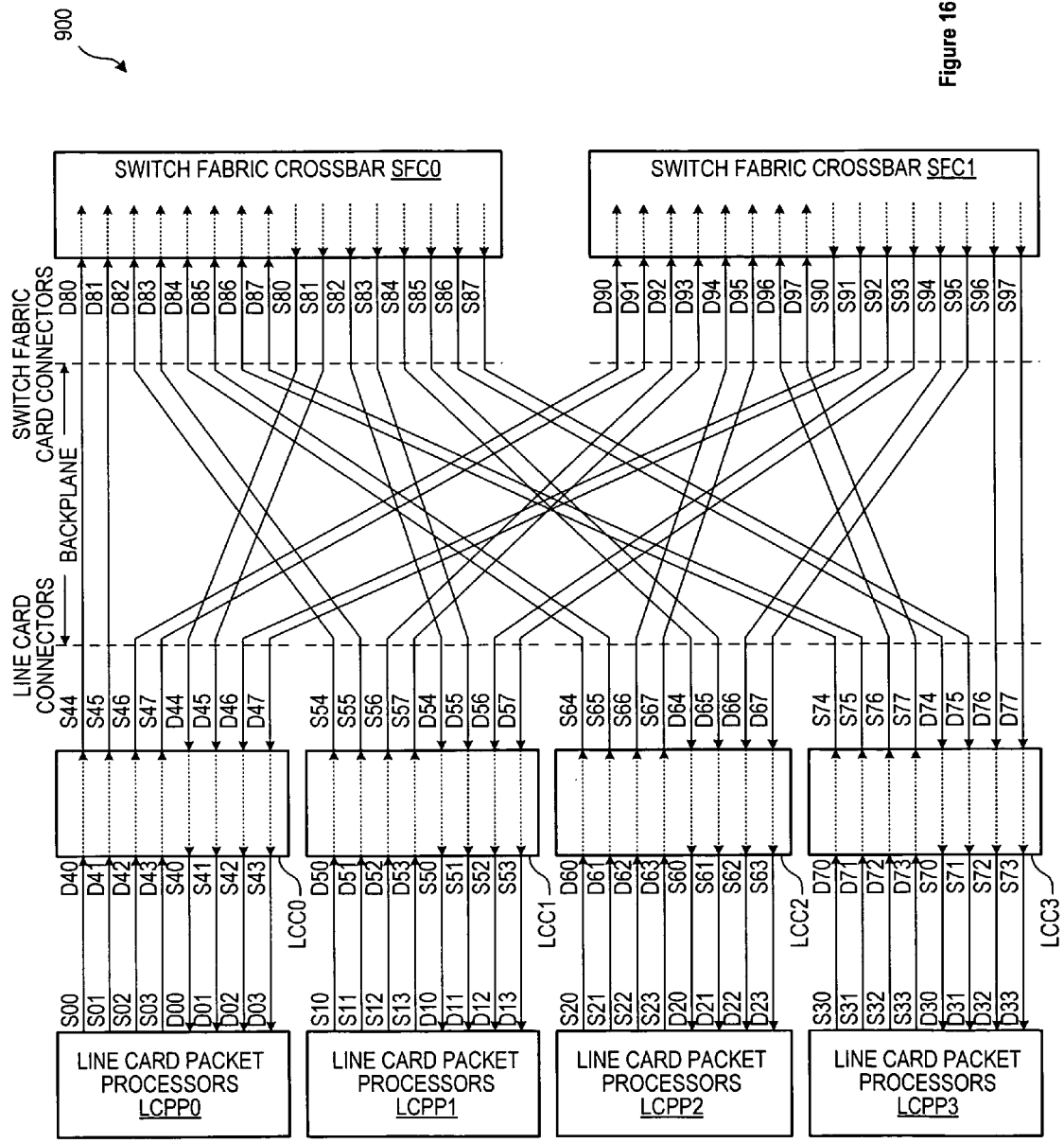
FIGS. 16, 17, and 18 show, for a reduced complexity example, two crossbar serializer-deserializer pairings and three logical channel pairings.
Figure 17:
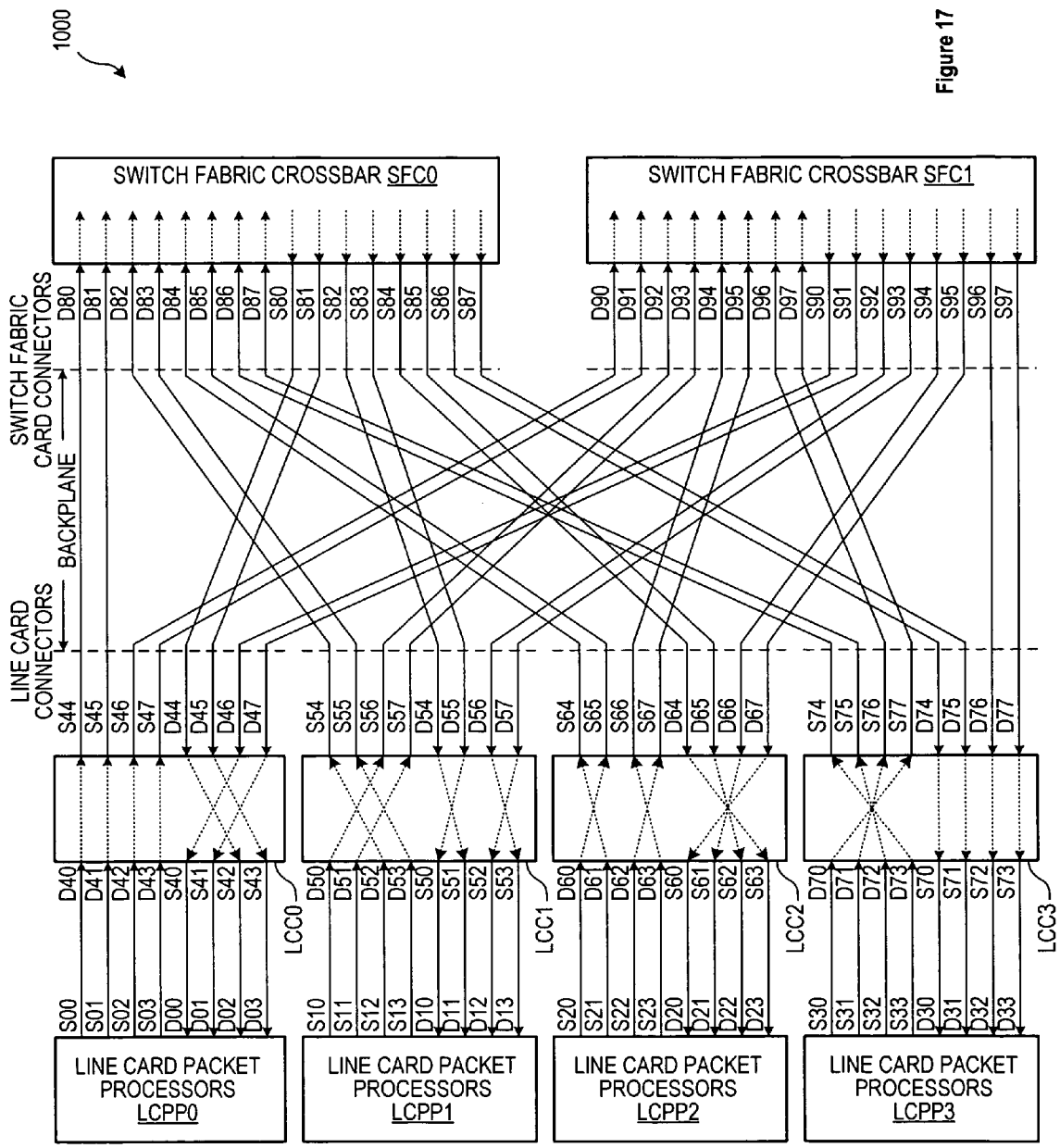
Figure 18:
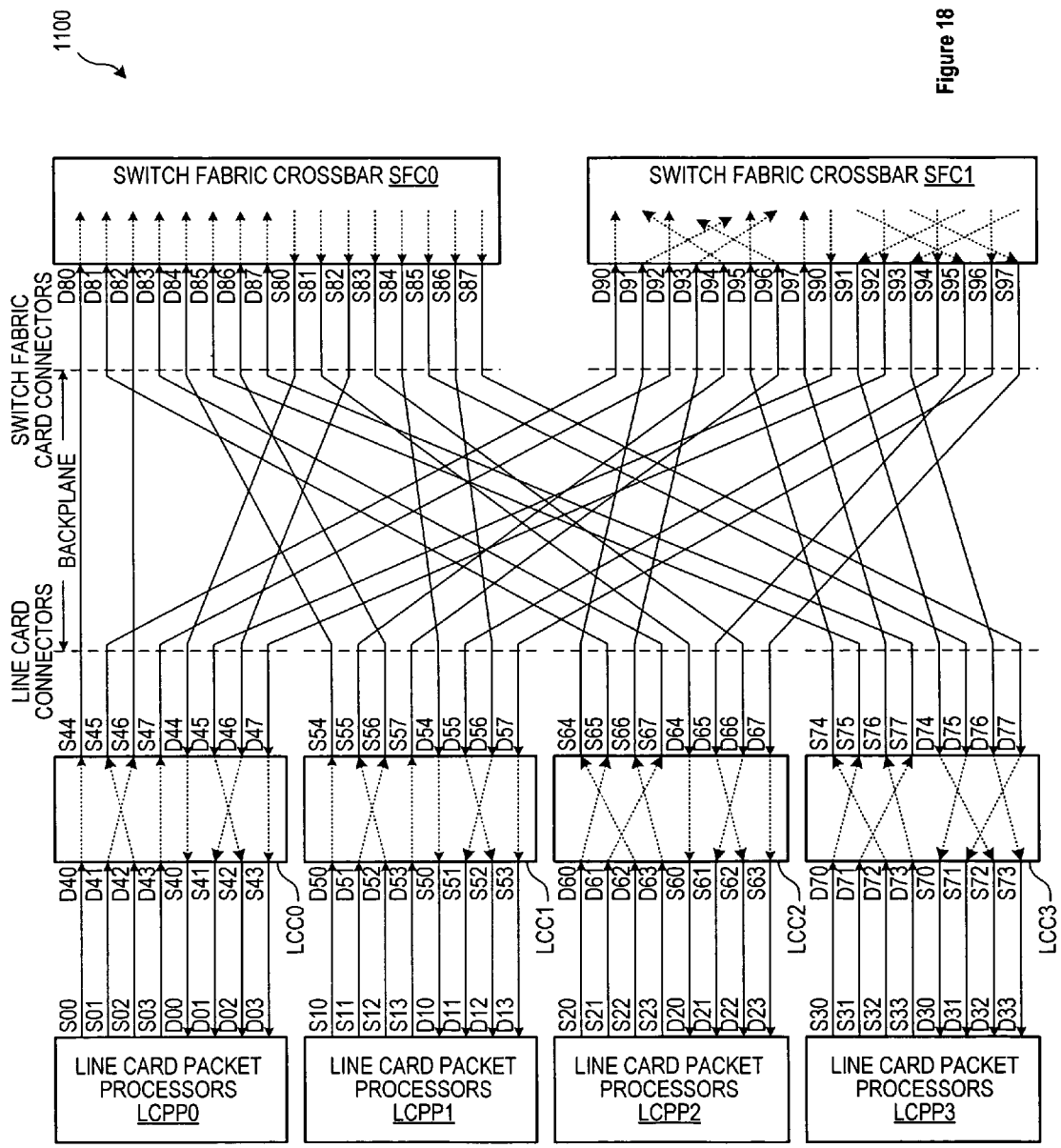

FIGS. 16, 17, and 18 illustrate three exemplary logical-to-physical mapping approaches with two different backplane arrangements. Each of these Figures illustrates four line card packet processors (combined ingress and egress functionality is shown for simplicity) LCPP0, LCPP1, LCPP2, and LCPP3. Each line card packet processor LCPPi has four sending serial channel ports Si0-Si3 and four receiving serial channel ports Di0-Di3. Each Figure also illustrates four line card crossbars LCC0, LCC1, LCC2, and LCC3. Each line card crossbar has eight sending serial channel ports S(i+4)0-S(i+4)7 and eight receiving serial channel ports D(i+4)0-D(i+4)7. Finally, each Figure also illustrates two switch fabric crossbars SFC0 and SFC1. Crossbar SFC0 has eight sending serial channel ports S80-S87 and eight receiving serial channel ports D80-D87, and crossbar SFC1 has eight sending serial channel ports S90-97 and eight receiving serial channel ports D90-97. Each Figure shows connections between the sending serial channel ports and the receiving serial channel ports.

In each Figure, each line card packet processor LCPPi connects to its corresponding line card crossbar LCCi in the same configuration, with sending serial channel ports Sij coupled to receiving serial channel ports D(i+4)j and sending serial channel ports S(i+4)j coupled to receiving serial channel ports D(i+4)j. This configuration could be varied (while remaining the same on each line card) if desired, with the logical mapping in each line card crossbar compensating. Were the configuration one that did not preserve the two-way relationship Sij→D(i+4)j and S(i+4)j→Dij, the line card crossbars would need knowledge of the mapping to properly convey backchannel information to the line card packet processors.

The backplane arrangement 900 shown in FIG. 16 has no backplane channel length optimization. In other words: each line card crossbar has the same sending serial channel ports sending to SFC0 and SFC1, respectively, and the same receiving serial channel ports receiving from SFC0 and SFC1, respectively; each switch fabric crossbar has the same sending serial channel ports sending to LCC0, LCC1, LCC2, and LCC3, respectively, and the same receiving serial channel ports receiving from LCC0, LCC1, LCC2, and LCC3, respectively. Thus in the FIG. 16 embodiment, a "straight-through" logical-physical mapping is possible on each crossbar, with each line card crossbar having an identical fixed mapping, and each switch fabric crossbar having an identical mapping for each epoch.

This arrangement and mapping can have crosstalk issues. For instance, consider a case where each line card uses the same four scrambler seeds, respectively, on its four sending serial channels, and the same four scrambler seeds, respectively, on its four receiving serial channels. This results in scrambler variations on neighboring pin pairs at the line card connector. But at the switch fabric connectors, only two scrambler seeds are in use, and alternate in a manner that reinforces crosstalk interference. It would be better to switch to an alternate mapping that does not provide this crosstalk reinforcement.

FIG. 17 depicts a backplane arrangement 1000 with the same physical connections as the FIG. 16 backplane arrangement 900. Arrangement 1000, however, uses a different logical/physical mapping in the line card crossbars. In this example, each line card crossbar LCCi maps its four packet processor inputs Di0-Di3 in a different pattern to its four switch fabric outputs Si0-Si3. With the packet processor scrambler seeds provisioned as described in the preceding example, this logical mapping allows each switch fabric crossbar to receive a varied pattern of all four scrambler seeds. The pattern received back at the line card crossbar is then "unshuffled" so that each line card packet processor continues to use the same descrambling seeds, no matter which sender is employed.

In the illustrated schedule example, the backplane-receive-to-processor-send mapping will vary at each line card crossbar for each epoch. This can be scheduled, however, by assigning one logical egress mapping to each line card source.

Each line card crossbar can then be programmed on a per-epoch basis using a single logical mapping command, which decodes to the correct shuffle pattern for the scheduled source and all egress lanes. In the example shown in FIG. 17, each line card is sending data to the line card immediately above it, with LCC0 sending to LCC3. Thus the "deshuffle" pattern in each line card crossbar matches the "shuffle" pattern of the neighbor line card.

FIG. 18 depicts a backplane arrangement 1100 for a hypothetical case with length/crosstalk-optimized physical channel assignment on the backplane. In this example, several optimizations are shown. First, no two physical channels neighbor each other at both a line card backplane connector and at a switch fabric backplane connector. Second, within this constraint, longer channels are optimized at the expense of shorter channels. Thus although each line card crossbar has the same number of serial channels to and from each switch fabric crossbar, several different logical-to-physical mappings are required. The correct mapping for each card will depend on its location in the chassis. Similarly, each switch fabric card position requires a different mapping of both inputs and outputs to follow the logical schedule. This mapping, like the FIG. 16 mapping, is static. Although not illustrated, the FIG. 18 embodiment can be further manipulated like the FIG. 17 mapping so that different lanes are sent to different switch points.

Two further permutations are also possible. First, where two subchannels are combined in the same serial stream, i.e., using PAM4 modulation, the logical-to-physical mapping may split the streams, recombine them in different ways, etc., to achieve further variability in the backplane transit serial streams. Second, logical scheduling need not send all ingress lanes from a given ingress processor to the same egress processor. For instance, the scheduler can support "half-logical-channel" scheduling, where the scheduler allows some (or all) ingress processors to fill half their lanes with data having one destination and the other half of their lanes with data having another destination. Logical channel identifiers can be configured in each crossbar for each "half-logical-channel" with data transmitted appropriately such that an egress processor can receive packet data from two sources in one epoch. This allows more frequent scheduling of input-output line card pairings that have frequent but not heavy packet traffic and thus do not need a full epoch's worth of data on all lanes at each schedule time.

As the above examples demonstrate, logical-to-physical mapping modifications in the illustrated switch chassis are possible after the physical configuration is set in place. Such modifications can be tested in a laboratory mode, i.e., to discover particular logical configurations with high empirical performance and low empirical crosstalk. Alternately, such modifications can be implemented in an online environment as problems are encountered. It is believed that such modifications can improve the performance of a running switch by reducing crosstalk between serial channels.

Figure 19:
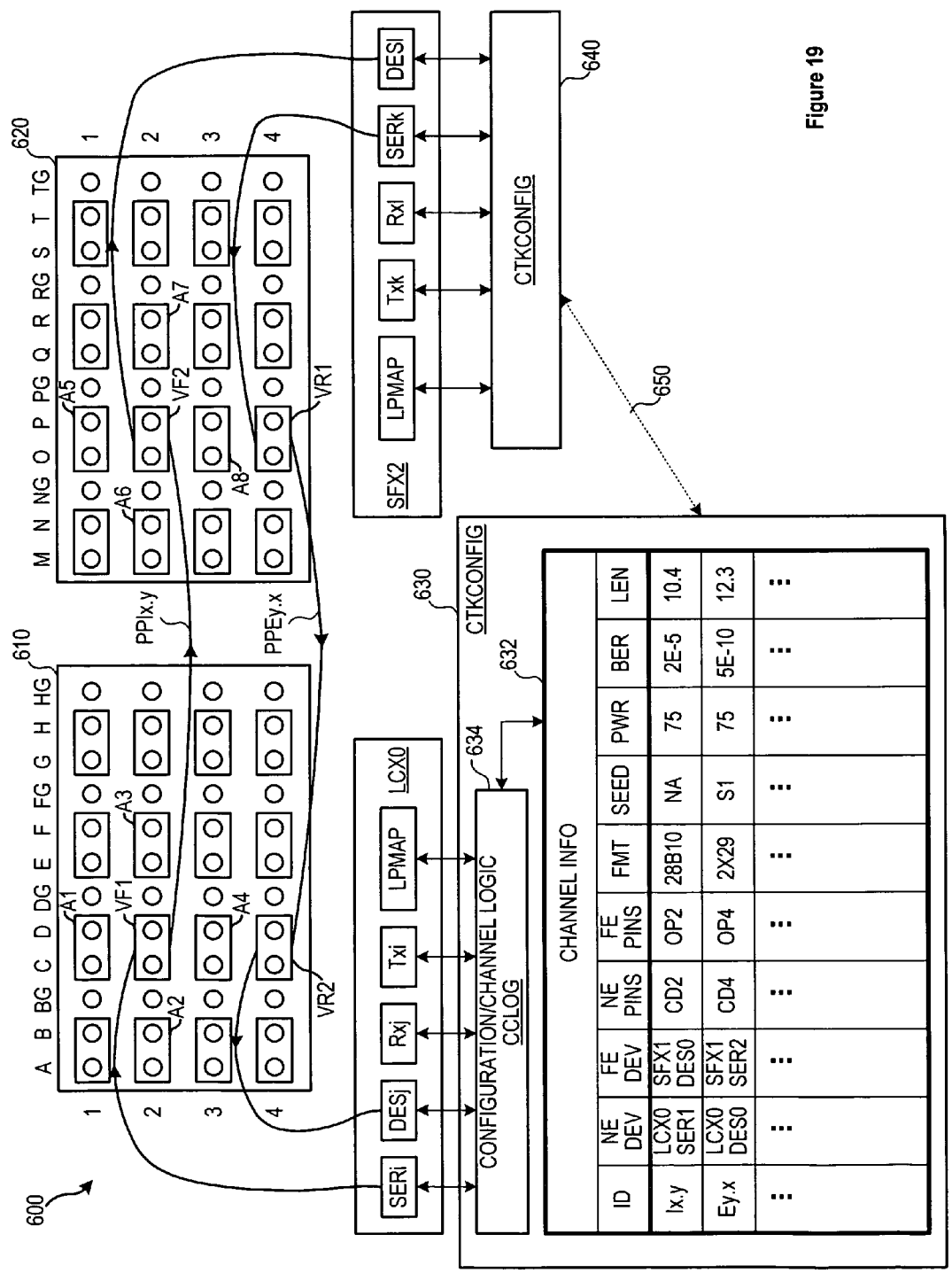
FIG. 19 shows a two-way path including components of two connected serial crossbar switches and two intermediate backplane connectors.

FIG. 19 shows a simplified exemplary configuration 600 for a forward channel PPix.y and a corresponding reverse channel PPEy.x between a line card crossbar LCX0 and a switch fabric card crossbar SFX1, where "x" is a logical designator for the line card and "y" is a logical designator for the switch fabric card. Forward channel PPIx.y connects a serializer SERi on the line card crossbar to a deserializer DES1 on the switch fabric crossbar. Reverse channel PPEy.x connects a serializer SERk on the switch fabric crossbar to a deserializer DESj on the line card crossbar. At the connection of the line card to the backplane, the forward and reverse channels pass through a connector block 610. At the connection of the switch fabric card to the backplane, the forward and reverse channels pass through a connector block 620.

Connector block 610 is depicted in end view, showing the spacing of the conductors in the connector block. The conductors are laid out in a grid in this example, with four rows 1-4 and twelve columns. The column pattern is laid out signal-signal-ground-signal-signal-ground: "A" and "B" are signal columns, followed by "BG", a digital ground column, followed by "C" and "D" signal columns, a "DG" digital ground column, "E" and "F" signal columns, an "FG" digital ground column, "G" and "H" signal columns, and an "HG" digital ground column. Conductors on neighboring signal columns in the same row (for instance A1, B1) are designed to carry differential signals, and are thus shown with a rectangle surrounding the pairs. Connector block 620 is arranged similarly, with rows 1-4 and columns M, N, NG, O, P, PG, Q, R, RG, S, T, and TG.

In the vicinity of the connector blocks, the forward and reverse channel conductor pairs pass in close proximity to other channel conductor pairs, and are thus subject to crosstalk from those other channel conductor pairs. For instance, the forward channel conductor pair PPIx.y is shown passing through connector block 610 connectors C2, D2 and connector block 620 connectors O2, P2. At connector block 610, the connector pair C2, D2 is a crosstalk victim VF1, primarily due to crosstalk from crosstalk aggressor pairs A1 (pair C1, D1), A2 (pair A2, B2), A3 (pair E2, F2), and A4 (pair C3, D3), to varying degrees. At connector block 620, the connector pair O2, P2 is a crosstalk victim VF2, primarily due to crosstalk from crosstalk aggressor pairs A5 (pair O1, P1), A6 (pair M2, N2), A7 (pair Q2, R2), and A8 (pair O3, P3). The crosstalk occurring on PPIx.y at connector block 610 is known as Far End CrossTalk (FEXT) because from the point the crosstalk signal is injected onto PPIx.y, it travels essentially the entire channel and is subject to the same degradation as the signal along this path. The crosstalk occurring on PPIx.y at connector block 620 is known as Near End CrossTalk (NEXT), as it travels only the end portion of the channel and will not be substantially degraded before reaching deserializer DES1.

Also shown in FIG. 19 are two crosstalk configuration "CTKCONFIG" blocks 630, 640. Each CTKCONFIG block is associated with a corresponding crossbar, and will typically be implemented using software on a management processor having register access to that crossbar. In two possible implementation options, the management processor may be local to the same card as the crossbar, or located on a chassis management card. As shown for CTKCONFIG 630, the function comprises a configuration database 632 and configuration/channel logic CCLOG 634. Configuration database 632 describes each logical subchannel handled by the corresponding crossbar, by describing for instance the physical channel endpoints for that subchannel, the connector pins used by that subchannel, and coding information for the subchannel, including the coding format in use, the scrambler seed in use, the power setting of the serializer, the calculated bit error rate for the subchannel, and the normalized channel length. CTKCONFIG also has access to crosstalk parameters for each conductor pair in each connector block, including significant crosstalk contributor pairs for that conductor pair by connector block location. CTKCONFIG can thus determine the NEXT and FEXT aggressors for each conductor pair, and look up those logical subchannels and their parameters in configuration database 632 as well.

Configuration/channel logic CCLOG 634 has the ability to perform register accesses on LCX0. These register accesses allow CCLOG 634 to reconfigure LPMAP translation tables, send commands to SERi and DESj, create backchannel message data for Txi, and obtain bit error data from Rxj in LCX0. CTKCONFIG 630 can also communicate through a control channel 650 (InterProcess Communication, for instance, wherein each CTKCONFIG is a separate instance running on different or the same processor) with CTKCONFIG 640 and other CTKCONFIGS handling other crossbars communicating with LCX0. With these abilities, CTKCONFIG 630 can actively manage all of the backplane serial channels that connect to LCX0.

Figure 20:
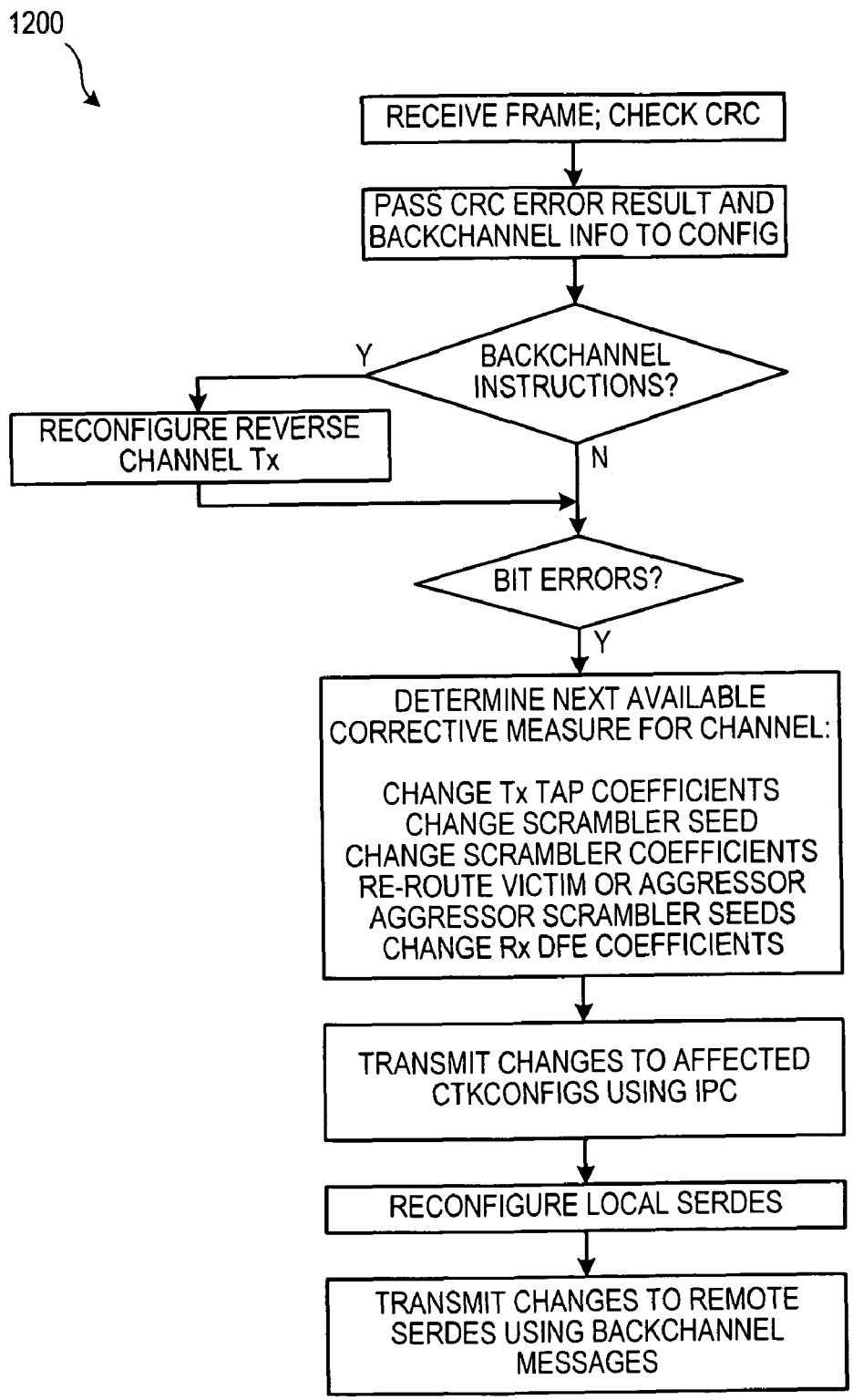
FIG. 20 contains a flowchart for a dynamic decision process for changing serdes characteristics and logical channel characteristics at run time to cope with crosstalk.

FIG. 20 contains a high-level flowchart for active management of crosstalk on a backplane channel. The crossbar receiver receives an epoch frame, checks the frame for CRC errors, and detects and removes backchannel information if attached. Any backchannel instructions are passed to the serializer that handles the reverse channel of the ingress/egress channel pair. This serializer may be any serializer on the crossbar, when the backplane connections are not constrained. Any CRC errors are passed to CTKCONFIG for consideration. CTKCONFIG analyzes the current configuration of the channel and any prior changes that have been made, and determined a corrective measure for the channel. When the corrective measure affects something under the control of another CTKCONFIG, those changes are communicated to the remote CTKCONFIG using IPC. When the corrective measure affects the local crossbar serdes, reconfiguration data is transmitted via register access to the affected crossbar serdes. When the corrective measure affects the remote crossbar serdes of the serial channel, reconfiguration data is placed in a backchannel message for communication to the remote serdes. Finally, in some cases CTKCONFIG may request a change in scrambler seed or scrambler coefficients, which affects configuration at the ingress and egress processors. Some corrective measures (such as re-routing channels or changing scrambler seeds/coefficients) may require that the backplane data communications be paused briefly while the configuration is changed.

The corrective measure determined by CTKCONFIG can, in one embodiment, depend on weighting values for possible corrective measures. For instance, CTKCONFIG may at first let the affected serializer and deserializer attempt to tune their respective transmit tap coefficients and receive decision feedback equalization (DFE) coefficients to improve the bit error rate. When these coefficients have had time to stabilize, and bit errors persist, CTKCONFIG then examines ways to improve the crosstalk situation for the channel. By consulting database 632 (FIG. 19), CTKCONFIG determines the position of the channel in both backplane connectors that is passes through, up to eight crosstalk aggressors for the channel, and crosstalk strength for each of the aggressors (based on both connector and through hole signal coupling). CTKCONFIG then steps through a preferred order of channel changes, e.g., for the victim and its aggressors in the order of impact and/or intrusiveness. A first pass can attempt a first change type for the strongest-coupled aggressor, and then if errors persist, attempt the first change type for the second strongest-coupled aggressor, etc. Once the change type has been tried for all aggressor channels, and the problem persists, a second change type can be attempted in the same order. In epoch-based systems, scrambler seed changes/seed-swapping reroutes can be attempted first, followed by power decreases for short channels, followed by scrambler coefficient changes/coefficient-swapping reroutes. In some cases, all aggressors can be analyzed together, and the victim re-routed or provisioned with a different scrambler seed or coefficient set as the most feasible or next potential solution. Rerouting can select a different channel with a desirable set of scrambler properties and no bit error problems and swap it with the problematic channel. Generally, shorter channels should be less sensitive to crosstalk, no matter how their aggressor neighbors are provisioned, and so are good candidates for swapping for a victim channel.

Although the crossbar described in FIGS. 5-12 does not perform scrambling/descrambling, a different crossbar embodiment can include this capability, allowing complete control of scrambling on all ingress and egress channels.

Those skilled in the art will appreciate that the embodiments and/or various features of the embodiments can be combined in other ways than those described. For instance, other switch fabric configurations can benefit from dynamic crosstalk management, although not all such configurations may be able to use all the techniques described herein. Although epoch-based switching formats are described, other switching formats can be adapted to use techniques described herein.

Although the specification may refer to "an", "one", "another", or "some" embodiment(s) in several locations, this does not necessarily mean that each such reference is to the same embodiment(s), or that the feature only applies to a single embodiment.

What is claimed is:

1. A method of routing differential trace pairs on an electrical backplane, comprising:
    using a processor for:
        identifying and storing the identities of backplane pin pairs at a first and second plurality of backplane card slots that will connect to differential trace pairs, each of the plurality of first card slots comprising at least one connector block having a pinout capable of accepting a first type of circuit card and each of the plurality of second card slots comprising at least one connector block have a pinout capable of accepting a second type of circuit card;
        selecting and storing logical pairings of differential traces to connect pin pairs on the connector blocks of the first card slots to pin pairs on the connector blocks of the second card slots, such that each first card slot connects to each second card slot via at least one of the differential trace pairs; and
        assigning and storing designated pin pairs to each logical pairing of differential traces, with routing priority and designated pin pair selection priority given to the logical pairings of differential traces with the longest routing distances, the assignment resulting in different pin pair assignments for at least two of the first card slots and resulting in different pin pair assignments for at least two of the second card slots.

2. The method of claim 1, wherein assigning designated pin pairs for each logical pairing of differential traces, with routing priority and designated pin pair selection priority given to the longest routing distances, comprises:
    calculating, for each logical pairing, at least one tentative best-case routing between an unassigned designated pin pair at the logical pairing first card slot and an unassigned designated pin pair at the logical pairing second card slot;
    assigning at least one of the logical pairings to the designated pin pairs corresponding to its tentative best-case routing, based on a ranking of the tentative best-case routing for logical pairings that have not been assigned a routing; and repeating calculating at least one tentative best-case routing and assigning at least one of the logical pairings for unassigned designated pin pairs and unassigned logical pairings.

3. The method of claim 2, wherein the at least one tentative best-case routing comprises multiple possible routings, each meeting a minimum criteria, the method pruning possible routings as other logical pairings select conflicting routings.

4. The method of claim 1, wherein the logical pairings of differential trace pair connections comprises unidirectional pairings either from one of the first card slots to one of the second card slots or from one of the second card slots to one of the first card slots, and wherein determining designated pin pairs at the first and second card slots comprises indicating whether each such pin pair is a transmit pin pair or a receive pin pair.

5. The method of claim 4, wherein, in computing a pin pair assignment for a logical pairing, a channel model considers end-to-end channel parameters for a pin pair assignment, the end-to-end channel parameters including channel effects both on the first card, for a differential pair connecting an integrated circuit to a pin pair on the first card, and on the second card, for a differential pair connecting an integrated circuit to a pin pair on the second card.

6. The method of claim 5, the channel parameters further comprising crosstalk parameters at least at the location of the circuit card-to-backplane connections.

7. The method of claim 6, wherein considering the channel model comprises excluding, for two logical pairings between the same first card slot and same second card slot, the selection of pin pairs resulting in significant crosstalk between the logical pairings at both the first card slot and the second card slot.

8. The method of claim 1, further comprising creating logical translation tables for each first and second card slot, the logical translation tables relating the pin pairs assigned to each logical pairing with the logical pairing.

* * * * *